US007996889B2

(12) United States Patent
Tsuchida

(10) Patent No.: US 7,996,889 B2
(45) Date of Patent: Aug. 9, 2011

(54) IMAGE PROCESSING APPARATUS, CONTROL METHOD FOR IMAGE PROCESSING APPARATUS AND CONTROL PROGRAM FOR IMAGE PROCESSING APPARATUS

(75) Inventor: Taro Tsuchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 11/190,918

(22) Filed: Jul. 28, 2005

(65) Prior Publication Data

US 2006/0026673 A1 Feb. 2, 2006

(30) Foreign Application Priority Data

Jul. 28, 2004 (JP) ................................. 2004-219553

(51) Int. Cl.
*G06F 7/04* (2006.01)
*H04L 29/06* (2006.01)
(52) U.S. Cl. .......................................... 726/9; 713/185
(58) Field of Classification Search .................... 726/27, 726/29, 9; 713/185
See application file for complete search history.

(56) References Cited

U.S. PATENT DOCUMENTS

| 6,590,673 | B2 * | 7/2003 | Kadowaki ..................... 358/1.15 |
| 6,802,007 | B1 * | 10/2004 | Canelones et al. ............ 713/193 |
| 2001/0021979 | A1 * | 9/2001 | Ito ................................... 713/189 |
| 2002/0126322 | A1 * | 9/2002 | Kadowaki ..................... 358/440 |
| 2004/0133712 | A1 * | 7/2004 | Yamamoto et al. ............. 710/23 |
| 2004/0181690 | A1 * | 9/2004 | Rothermel et al. ............ 713/201 |

* cited by examiner

Primary Examiner — Vivek Srivastava
Assistant Examiner — Samuel Ambaye
(74) Attorney, Agent, or Firm — Fitzpatrick, Cella, Harper & Scinto

(57) ABSTRACT

When an unregistered PC card 111 not having an access level registration is mounted in a PC card reader part 110, a user interface requesting an access level setting to the user is executed through an operation unit 103 or a display part 104 (or a local host 112). Also when a PC card 111, having registration as to whether or not to transmit the mounting and on a destination of notice of the mounting, is mounted in the PC card reader part 110, a PC card mounting notice message is transmitted to a destination according to such registered information.

With this configuration, there is provided an access control comprehensively usable to the PC cards of various types, capable of activating an access control user interface at the PC card mounting and transmitting a PC card mounting to host/user.

18 Claims, 29 Drawing Sheets

FIG. 6

| 0 | DTYPE_NULL | NO DEVICE |
|---|---|---|
| 1 | DTYPE_ROM | MASKED ROM |
| 2 | DTYPE_OTPROM | ONE TIME ROM |
| 3 | DTYPE_EPROM | UV EPROM |
| 4 | DTYPE_EEPROM | EEPROM |
| 5 | DTYPE_FLASH | FLASH MEMORY |
| 6 | DTYPE_SRAM | SRAM |
| 7 | DTYPE_DRAM | DRAM |
| 8-C | -- | RESERVED |
| D | DTYPE_IO | I/O |
| E | DTYPE_EXTEND | EXTENDED |
| F | -- | RESERVED |

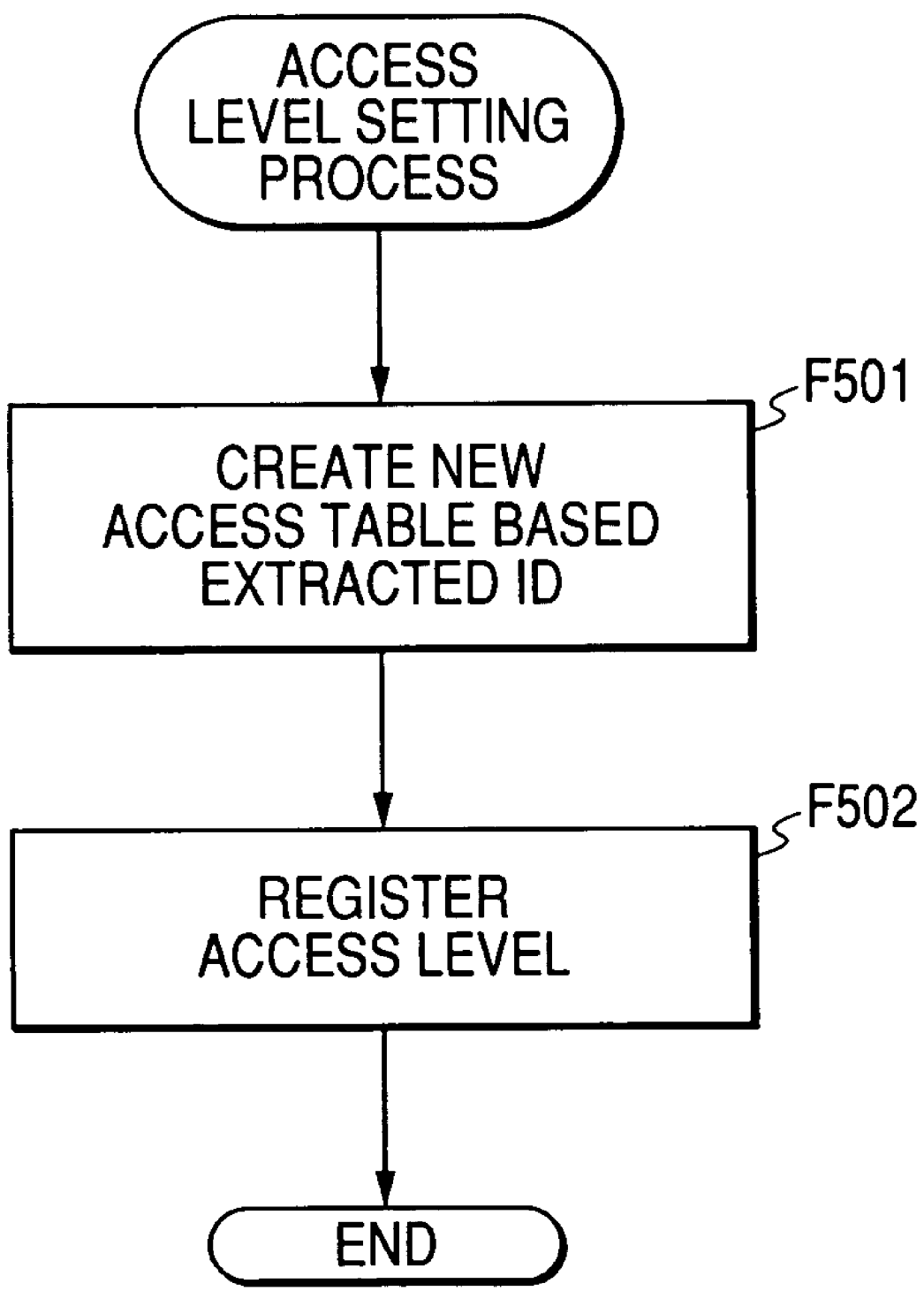

| CARD ID | DEVICE INFO | SET | DATA ON HOST TO BE NOTICED | |
|---|---|---|---|---|
| 342a | AAA FLASH MEMORY CARD | YES | REMOTE HOST | PC01 |
| 3d0a | BBB V34FAX/DATA MODEM | NO | | |
| 84ec | CCC SCSI I/F CARD | NO | | |
| c41b | DDD ROM CARD | YES | LOCAL HOST | |
| 1801 | | 1802 | 1803 | 1804 |

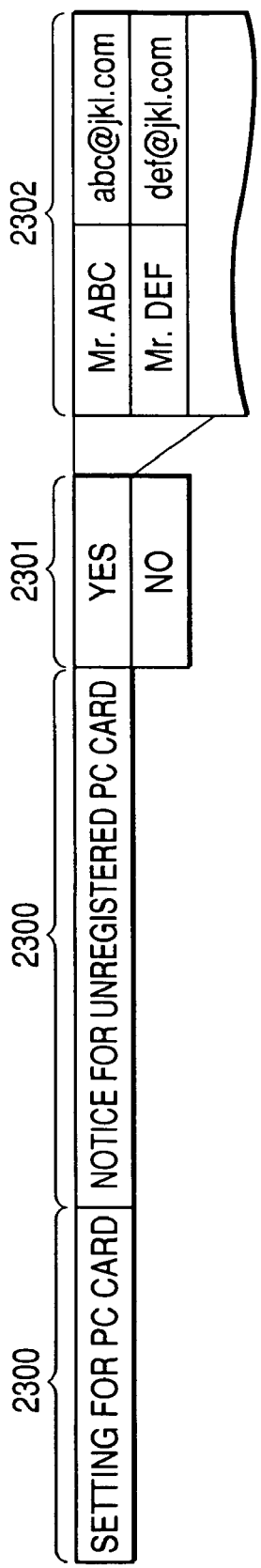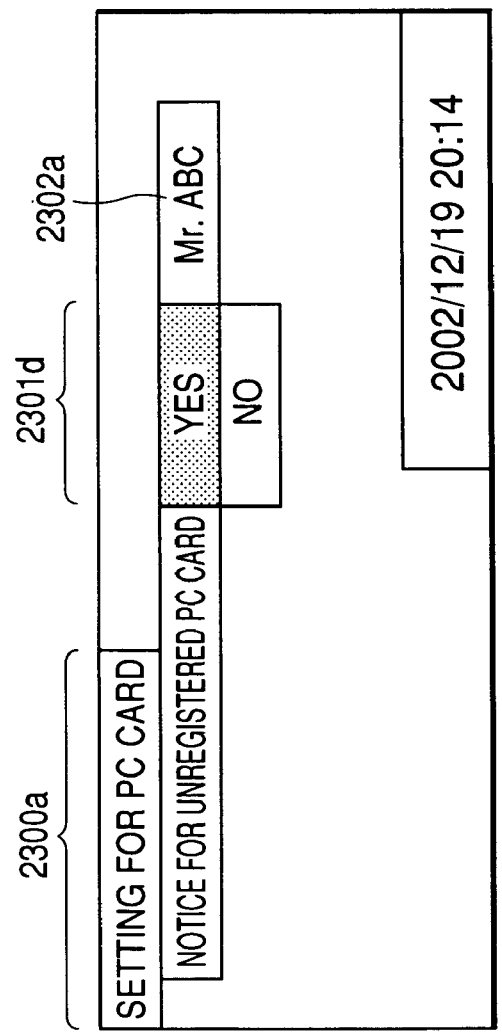

FIG. 28

| PC CARD REGISTRATION TABLE ||||
|---|---|---|---|
| CARD ID | DEVICE INFO | SET DATA ON USER TO BE NOTICED ||
| 342a | AAA<br>FLASH MEMORY CARD | YES | Mr. ABC | abc@def.ghi.com |
| | | | Mr. DEF | def@ghi.jkl.com |
| 3d0a | BBB<br>V34FAX/DATA MODEM | NO | |
| 84ec | CCC<br>SCSI I/F CARD | NO | |
| c41b | DDD<br>ROM CARD | YES | Mr. DEF | def@ghi.jkl.com |
| 2801 | 2802 | 2803 | 2804 |

| SETTING OF NETWORK | |
|---|---|
| IP ADDRESS | 192.168.0.2 |
| SUB-NET MASK | 255.255.255.0 |
| DNS SERVER | 192.168.0.100 |
| DEFAULT GATEWAY | 192.168.0.1 |
| SMTP SERVER | 192.168.0.200 |
| FROM SETTING | mfp01@jkl.com |

IMAGE PROCESSING APPARATUS, CONTROL METHOD FOR IMAGE PROCESSING APPARATUS AND CONTROL PROGRAM FOR IMAGE PROCESSING APPARATUS

BACKGROUND OF THE INVENTION

1. Field of the Invention

The present invention relates to an image processing apparatus having PC card interface for detachably attaching a PC card constituting a predetermined device for executing data input/output, a control method therefor and a control program therefor.

2. Related Background Art

A PC card is widely utilized together with a personal computer (hereinafter represented as PC). The PC card is available in various formats, such as one mounted with a memory device such as a ROM, a RAM or an HDD, or one mounted with an I/O interface such as a SCSI interface or a CSMA/CD (Ethernet: trade name). As an I/O standard for the recent PC card, there is usually employed a PCMCIA (personal computer memory card international association: URL=http://www.pcmcia.org/) method.

For utilizing a PC card, the PC has to be equipped with a PC card interface (hereinafter also written as PC card reader), and a host equipment making access to the PC card has been limited to a PC but the PC card reader is recently equipped not only in the PC but also in peripheral equipment such as a printer and a facsimile.

On the other hand, it is becoming common to utilize an information processing apparatus such as a PC, a printer or a facsimile by connecting with a network such as a LAN.

In such network environment, such information processing apparatus (hereinafter also called a host) can make an access to mutual resources by a specified protocol. Naturally the resource such as a PC card is not an exception and can be accessed not only from the host having the PC card interface but also from other hosts on the network.

In order to share a resource such as a disk (folder/printer) or a printer among the host on a network, there is utilized, for example in Windows (trade name), a resource sharing protocol such as NetBIOS/CIFS (Common Internet File System)/SMB (Server Message Block).

Such resource sharing protocol enables an access control to a host resource in the unit of a file or a folder on a file system or in the unit of a printer, from other hosts. In such operation, it can set different access levels to a specified host resource, such as enabling or inhibiting an access by a specified host or a specified group of hosts, or by a user or a group of users, or enabling or inhibiting a readout only. It can also include a user identification such as a password matching.

For example the PC card is a memory device such as ROM/RAM/HDD and is suitably formatted in a file system employed in the OS, an access control is made possible in the unit of a folder or a file on such file system.

However, the PC card is not limited to such memory device, and is not necessarily used in a format of a specified file system. Therefore, a resource sharing protocol such as CIFS(SMB) can only achieve an access control on a PC card such as a disk (folder/file) or a printer, and there is now known an access control system capable of achieving an access control at the level of PC card itself and comprehensively usable in PC cards of various formats.

Also the PC card can be freely detached or attached even when the host is in an active state (hot swapping), so that the user can freely change the PC card to a necessary one during the operation of the host. In the prior technology, when the PC card is changed, the user has to manually set the access control based on his discretion (though the access control is restricted to a case where the PC card is a memory device such as ROM/RAM/HDD as described above), and the PC may be continued to be used in a dangerous permission setting in certain cases.

SUMMARY OF THE INVENTION

In consideration of the foregoing, an object of the present invention is to provide a method of access control comprehensively applicable to the PC cards of different types, also to automatically activate a user interface for the access control on the PC card at the mounting thereof whereby the user does not forget a setting of the access control on the PC card, and, in case a PC card without a PC card setting is inserted, to appropriately inform the host or the user of such situation.

BRIEF DESCRIPTION OF THE DRAWINGS

FIG. 6 is a schematic view showing device types of the PC card;

FIG. 7 is a flow chart showing an access level setting process in the image processing apparatus of the embodiment 1;

FIG. 23 is a schematic view showing registration information for a destination of a notice for a PC card mounting, in the image processing apparatus of the embodiment 3;

FIG. 24 is a schematic view showing a user interface for registering a destination for a notice of a mounting of an unregistered PC card in the image processing apparatus of the embodiment 3;

FIG. 28 is a schematic view showing a PC card registration table in the image processing apparatus of the embodiment 3;

DETAILED DESCRIPTION OF THE PREFERRED EMBODIMENTS

In the following, there will be shown embodiments on an image processing apparatus provided with a PC card interface (PC card reader), image reading means, image recording means and image communication means. Such image processing apparatus is generally made available as so-called MFP (multi-functional printer).

Embodiment 1

Figure 1:
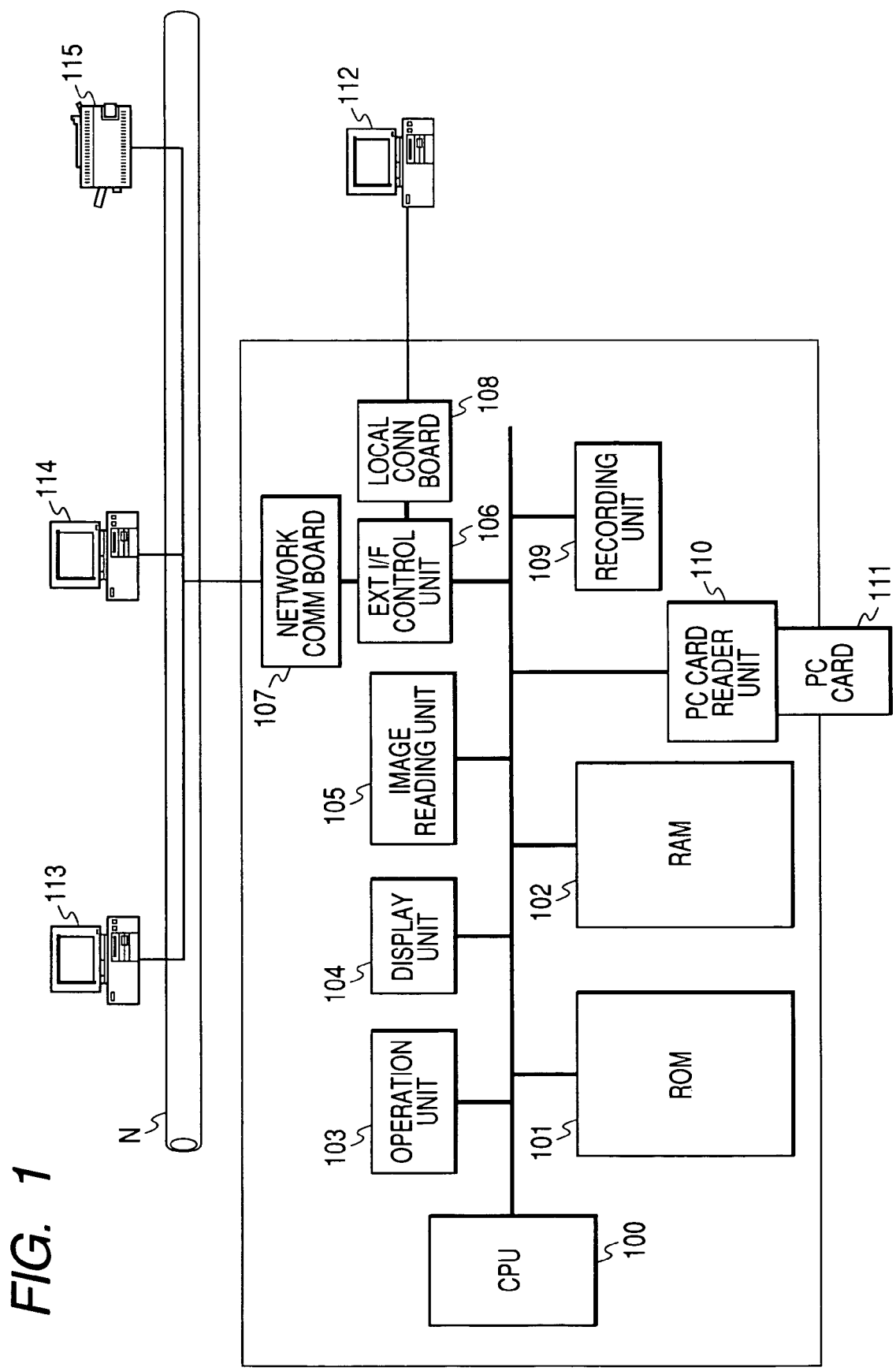
FIG. 1 is a block diagram showing a configuration of an image processing apparatus of an embodiment 1 of the present invention and a network environment in which the image processing apparatus is connected.

In the following an embodiment of the present invention will be explained with reference to the accompanying drawings. FIG. 1 shows a configuration of a control system of an image processing apparatus of the invention (in lower part of FIG. 1), and a network environment in which such image processing apparatus is installed. At first there will be explained a configuration of the image processing apparatus.

Referring to FIG. 1, a CPU 100 is a system controller which controls an entire apparatus constituted of following units. A ROM 101 stores control programs for the CPU 100, including a control procedure of the present embodiment to be explained later. The RAM 102 is formed by an SRAM or the like, and stores variables for program control. Also a destination of transmission and various set values registered by an operator, management data for the apparatus, and work buffers are also stored in the RAM 102.

In the present embodiment, a control procedure to be explained later is executed by the CPU 100 and it is assumed that the control procedure is stored as a control program for the CPU 100 in the ROM 101 (same also in other embodiments).

A display part 104 is constituted of an LCD or an LED and is used for notifying the user of various information. An operation part 103 is constituted of a keyboard or a touch panel, and is used by an operator to execute various input operations.

An image reading part 105 is constituted of a contact sensor or a CCD and an original conveying system, and reads image information from an original under the control of the CPU 100.

A recording part 109 is formed by an arbitrary recording method such as an ink jet method or an electrophotographic method, and is used for recording image data received from another host or facsimile data received through an unillustrated communication interface.

An external I/F control part 106 is connected to a network communication board 107 and a local connection board 108 (or another external I/F) and executes an arbitration of data exchange with the exterior of the apparatus.

A network communication board 107 is connected to a network N such as LAN or WAN, and is used for executing data transmission/reception with a communication apparatus or a PC in the exterior.

A local connection board 108 is used for executing data exchange with a local host 112, utilizing a USB interface or a centronics interface.

A PC card reader part 110 constitutes a PC card interface, and is used for accessing to a PC card, according to the PC card standard defined by JEIDA/PCMCIA. The name "PC card reader" is used only for the convenience and it can also be a PC card interface that can execute a writing operation to the PC card (a writing operation being required for example for a flash memory).

A PC card 111 is based on the PC card standard defined by JEIDA/PCMCIA. The PC card 111 is mounted as an I/O device of a ROM, a RAM, a flash memory, a SCSI interface, a CSMA/CD (Ethernet; trade name) and the like.

The PC card of JEIDA/PCMCIA standard includes various memory cards, an HDD card, a modem card, a network interface card, a SCSI interface card and the like, and such PC card 111 is used for supplying the image processing apparatus shown in FIG. 1 with an optional font, for providing an expanded memory area, or for connecting a facsimile, an external memory apparatus or a scanner.

In the following description, a PC connected to the local connection board will be called a "local host", while a PC connected to a LAN connected to the network communication board will be called a "remote host".

The image processing apparatus shown in FIG. 1 is connected through the local connection board 108 to a local host 112 (PC 03), and through the network communication board 106 and the network N to remote hosts 113, 114 (PC 01, PC 02) and another image processing apparatus 115 (MFP 03).

<Discrimination of Network Connection>

In the following there will be explained how the system shown in FIG. 1 functions in cooperation.

Figure 2:
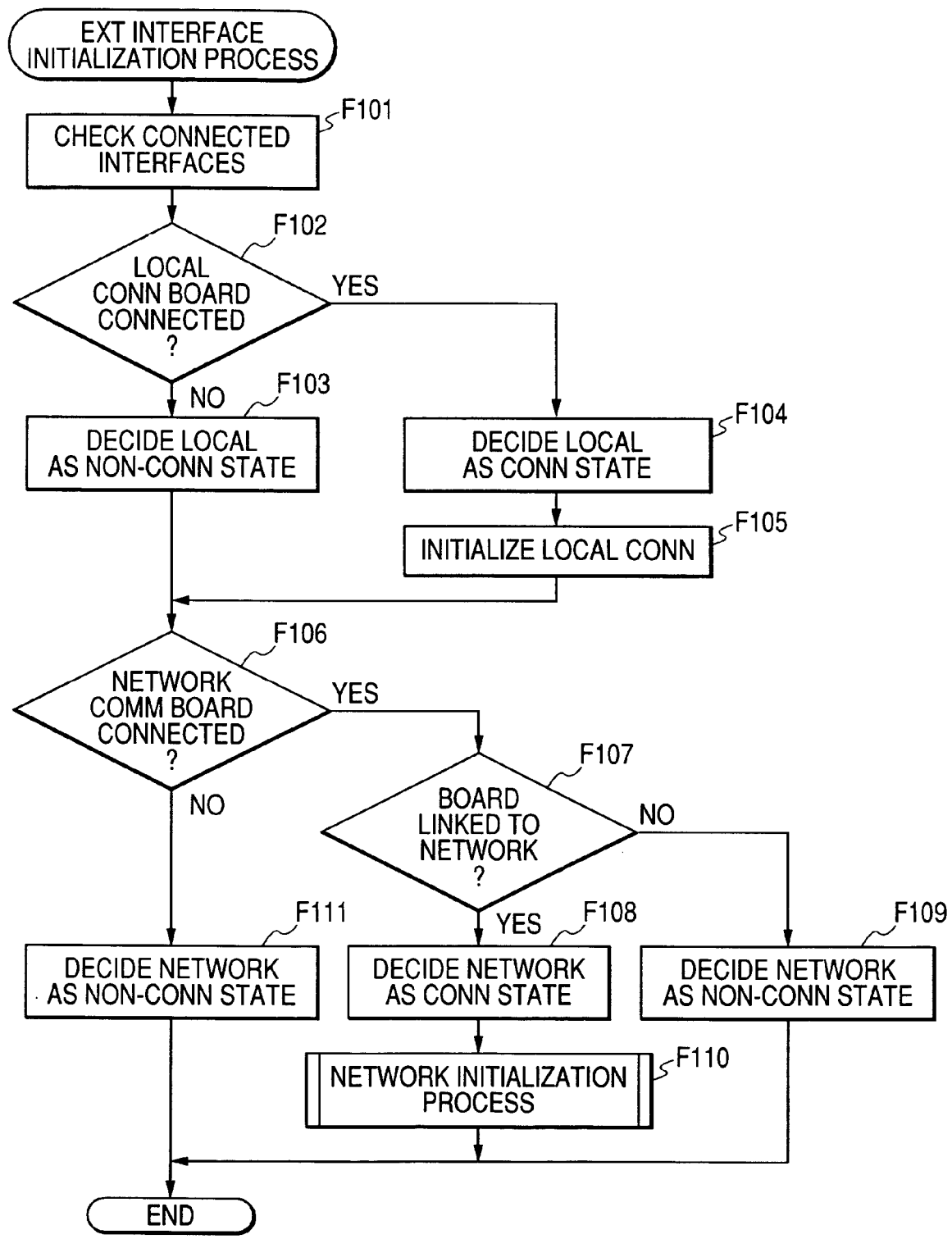
FIG. 2 is a flow chart showing an initialization process of an external interface of the image processing apparatus of the embodiment 1.

The image processing apparatus shown in FIG. 1 discriminates, at a turning-on of power supply, presence/absence of local/network connection by a procedure shown in FIG. 2.

The procedure shown in FIG. 2 discriminates presence/absence of local/network connection, in an initialization process at the turning-on of the power supply, by checking a state of the network communication board 107 and the local connection board 108 connected to the external I/F control part 106 shown in FIG. 1.

In the sequence shown in FIG. 2, when a check for an I/F connected to the external I/F control part is initiated (step F101: hereinafter a step number only being shown for the purpose of simplicity), there is at first confirmed presence/absence of a local connection board 108 (F102). In the present embodiment, it is assumed that a connection board for a USB connection is provided as the local connection board 108.

In case such board is not connected, the local connection is identified absent and the sequence proceeds to a next step (F103). In case the local connection board 108 is present, there is executed an initialization process for the local connection (F104, F105).

Then there is confirmed presence/absence of a network communication board 107 (F106). In the presence of the network communication board 107, there is also discriminated whether the network communication board 107 is linked with a network N (F107). Such discrimination of the link is carried out by discriminating whether an electrical connection state is realized, for example by discriminating whether an operation of a second layer of OSI in ISO is confirmed.

In case the step F107 in FIG. 2 identifies presence of a link, a network connection state is identified and a network initialization process is executed (F108, F110). In this stage, there is executed an initialization process for example of a TCP/IP layer or a NetBIOS/CIFS layer (In the following, protocol of NetBIOS/CIFS is utilized for resource sharing on the network).

In case the network communication board 107 is absent (No in F106) or the network communication board 107 is present but is not linked (No in F107), a network non-connection state is identified and the external I/F initialization process is terminated (F111, F109).

Figure 3:
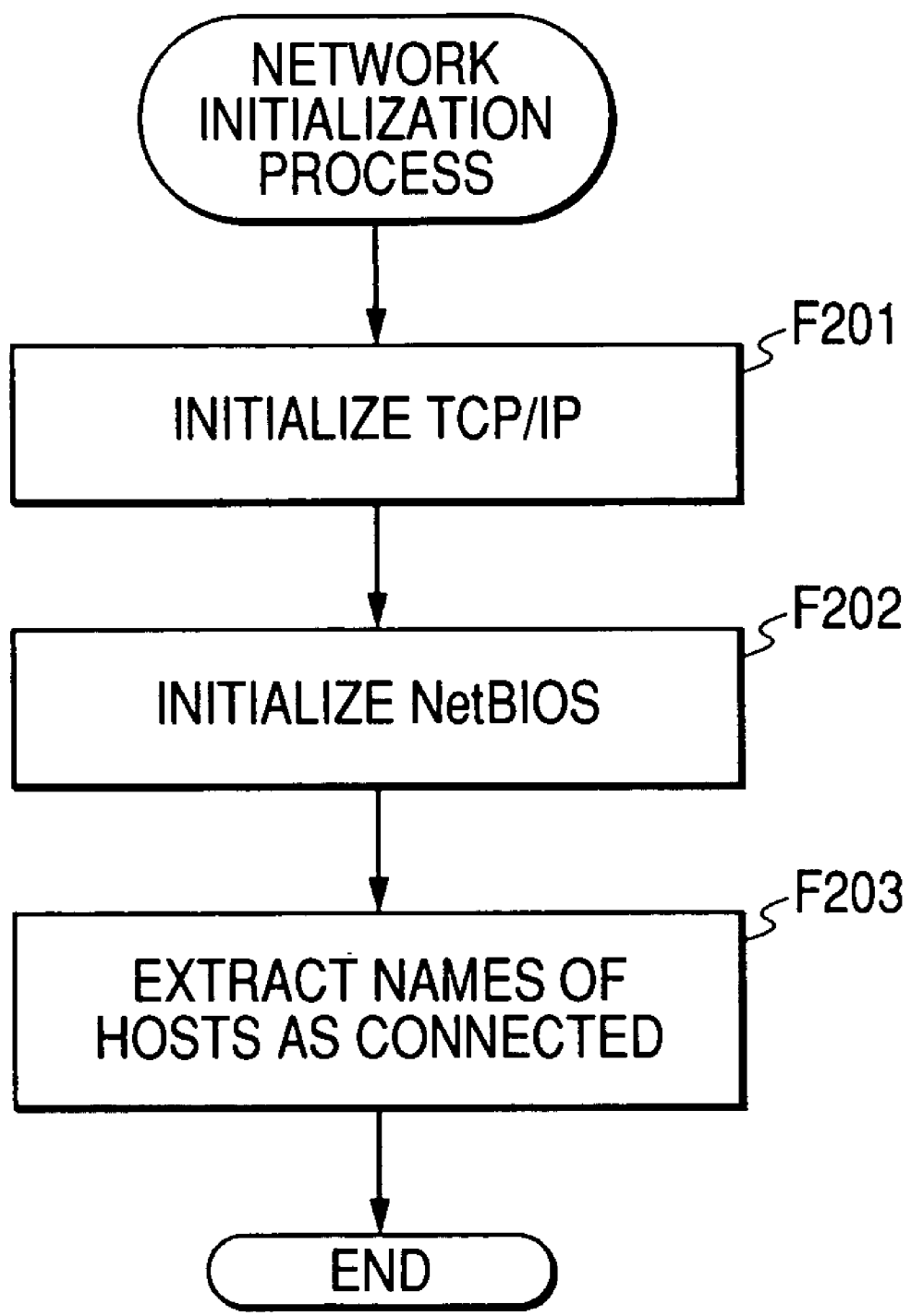
FIG. 3 is a flow chart showing a network initialization process in the image processing apparatus of the embodiment 1.

In case a network connection state is identified in FIG. 2, a network initialization process (F10) is executed, and this process is executed as shown in FIG. 3.

At first a TCP/IP initialization process is executed (F201). In the present embodiment, details of the initialization of the network are not explained, but the network connection at the TCP/IP level is executed at first, since the present embodiment utilizes the NetBIOS on TCP/IP. Then NetBIOS is initialized (F202), whereby the image processing apparatus shown in FIG. 1 joins the Windows network on the network N.

Finally, a protocol of NetBIOS is used to collect and store names of hosts connected in the same network (F203). In the example shown in FIG. 1, There are collected NetBIOS names such as "PC 01", "PC 02" and "MFP 03". Such collected host names are stored in the RAM 102 and are used in setting an access control to be explained later.

<Setting of Access Control for New PC Card (Unregistered PC Card)>

The present embodiment executes an access control on the PC card, and there can be set in advance whether or not to set an access control when a new PC card (unregistered PC card) is detected. Such setting determines whether or not to execute an access control when a new PC card is mounted.

In case this setting selects "no access control" on a new PC card (unregistered PC card), an access to the PC card by the communication apparatus is not restricted when a PC card is newly connected but is conducted in the same manner as in the prior technology.

Also in case "access control" is set for a new PC card (unregistered PC card), when a PC card is newly mounted, there are executed a setting of access control and a restriction control for an access from the exterior as explained in the following.

<In Case of Mounting of an Unregistered PC Card>

In the following there will be explained a process flow in case a PC card is mounted, such as an access control for a new PC card (unregistered PC card) and a storage of control information. Operations explained in the following are executed in case a setting of "access control" is made for the new PC card (unregistered PC card).

Figure 4:
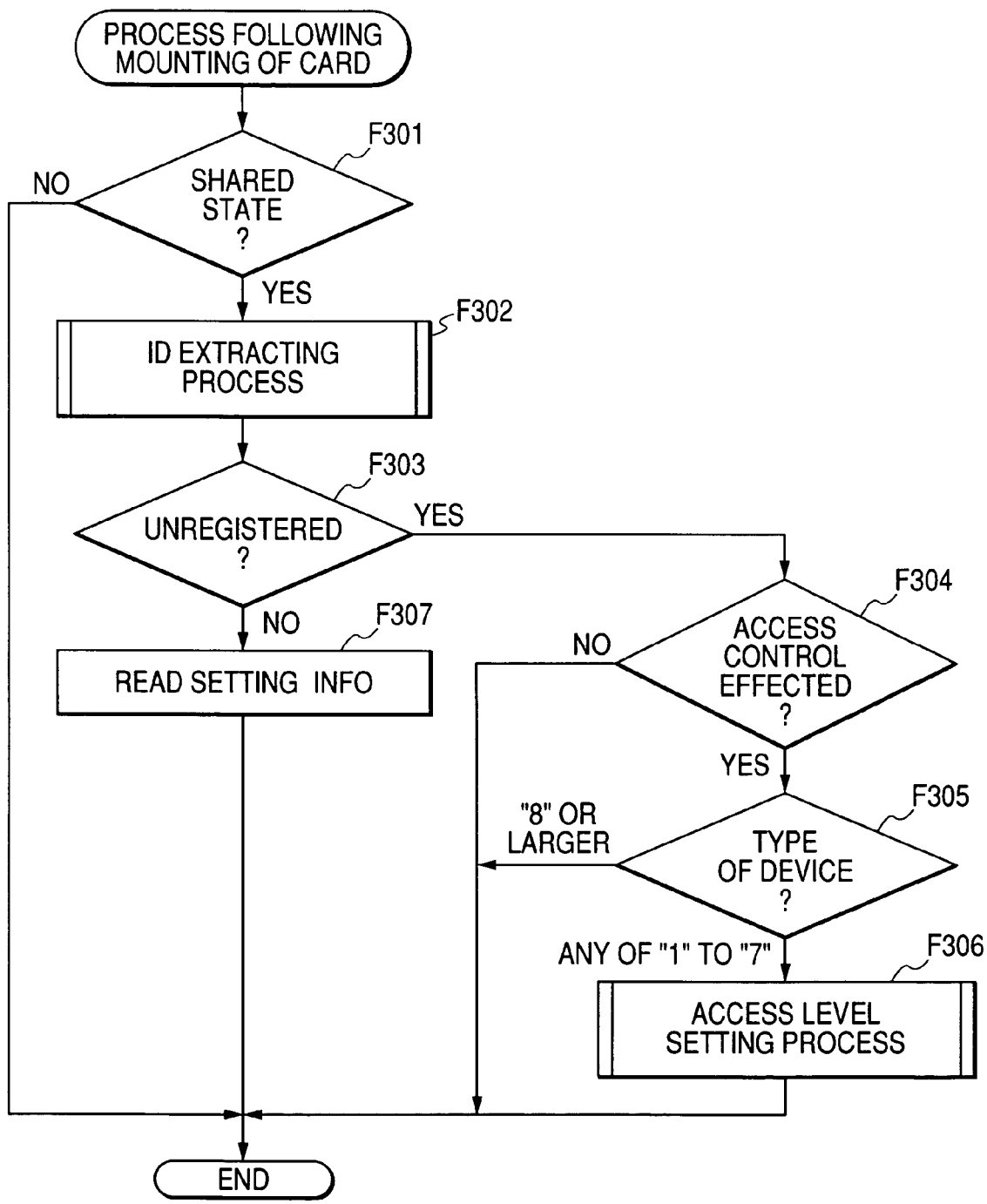
FIG. 4 is a flow chart showing a process of the image processing apparatus of the embodiment 1 at a mounting of a PC card.

When the operator inserts a PC card 111 in a PC card reader part 110 of the apparatus, the PC card reader part 110 detects a mounting of the PC card whereupon the CPU 100 initiates a process following mounting of the card shown in FIG. 4.

At first there is discriminated whether a device corresponding to the PC card 111 is in a "shared state", namely a state where a network connection is present and a device corresponding to the PC card 111 is accessible from another host (or another apparatus) on the network N (F301). Such shared/non-shared states can be switched by a predetermined user interface of a local host 112 (or the image processing apparatus shown in FIG. 1).

In case it is identified that a network connection is present and that the device corresponding to the PC-card 111 is in a "shared" state, namely it can be shared by plural hosts, the sequence proceeds to an ID extraction process (F302).

Also in case it is identified that a network connection is absent or that the device corresponding to the PC card 111 is not in a "shared" state, the process shown in FIG. 4 is terminated, and an ordinary operation of the card reader is executed without executing a setting of an access level. In this case there is not executed an access control on the device corresponding to the PC card 111.

Figure 5:
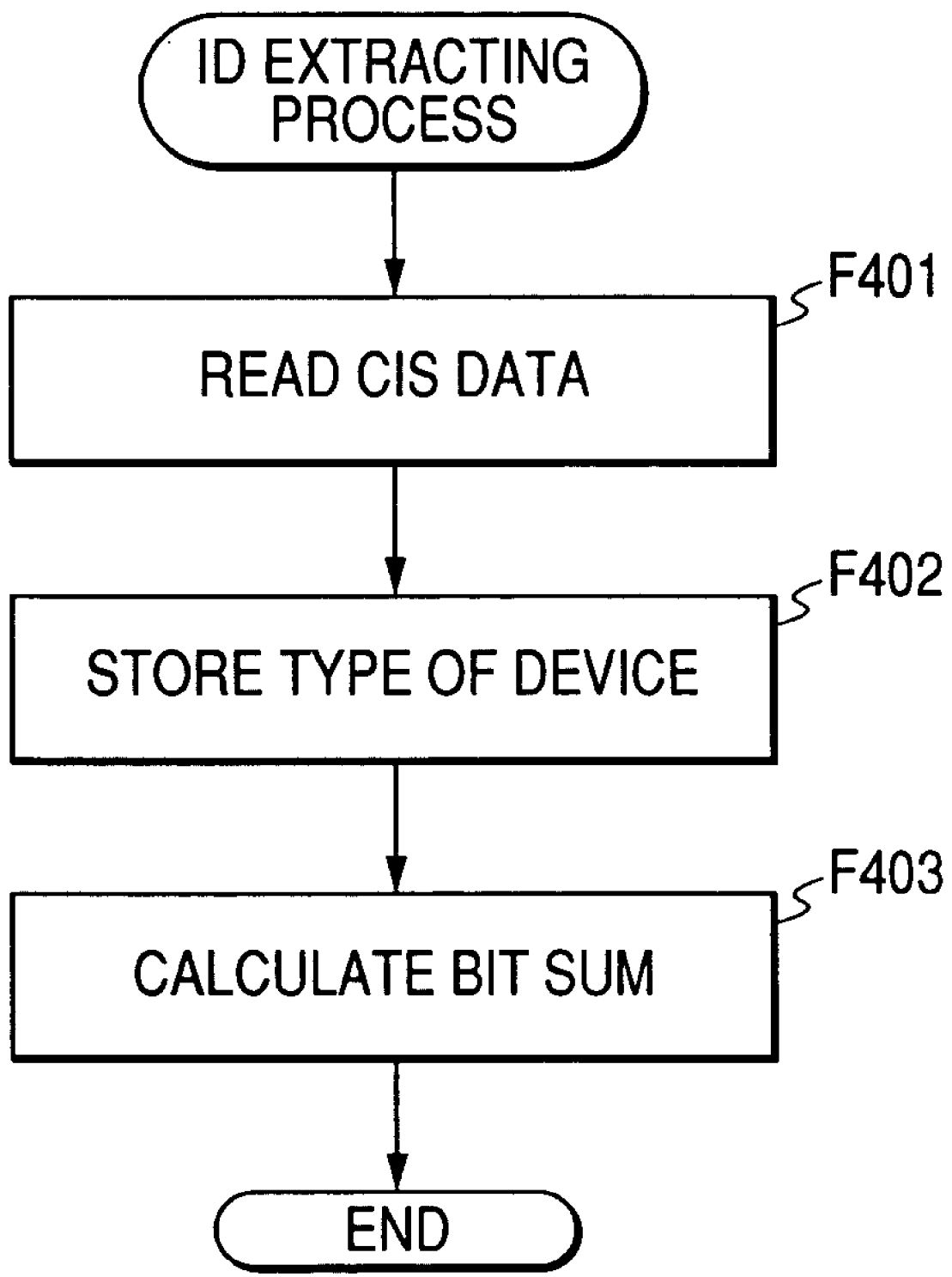
FIG. 5 is a flow chart showing a PC card ID extracting process of the image processing apparatus of the embodiment 1.

An ID extraction process (F302) executes a process of extracting a unique ID from the mounted PC card 111 by a procedure shown in FIG. 5.

In the present embodiment, a unique ID is extracted by referring to a table of card information, called CIS (card information structure) according to the format of the PC card defined by JEIDA/PCMCIA and calculating a check sum thereof (F401, F402, F403).

More specifically, CIS information, present in an attribute memory area of the PC card 111, is read from the beginning (CISTPL_DEVICE) to the last (CISTPL_END) (F401). The CIS describes various information such as type and characteristics of device, name of vendor and product name).

In the present embodiment, all these information are read as numerical values, in which device type information is stored in the RAM 102 (F402) and a 16-bit sum is calculated as stored in the RAM 102 (F403). In this manner, a unique ID is generated and stored for the mounted PC card 111.

The type of the device of the PC card 111 can be extracted for example from CISTPL_DEVICE in the CIS information. A format of the CISTPL_DEVICE is standardized as shown in FIG. 6. For example, in case the CISTPL_DEVICE has a value 5 (DTYPE_FLASH), it can be judged that the device of the PC card 111 is a flash memory. F402 in FIG. 5 stores the value of the CISTPL_DEVICE as a device type information in the RAM 102.

Again referring to FIG. 4, in case the ID extraction process identifies an unregistered ID (F303) and in case of "access control" on the unregistered card (F304), there is discriminated whether the device type of the PC card 111 is any of "1" to "7" (as shown in FIG. 6, the device is a ROM, a RAM or a flash memory) (F305).

In the present embodiment, an access control on the PC card 111 is executed only when the device type of the PC card 111 is any of "1" to "7" (as shown in FIG. 6, the device is a ROM, a RAM or a flash memory).

Thus, in case the device type of the PC card 111 is any of "1" to "7" (as shown in FIG. 6, the device is a ROM, a RAM or a flash memory), there is executed an access level setting process (F306).

In case F305 identifies that the device type of the PC card 111 is "8" or larger, namely in case the PC card 111 is identified as a device of a function other than a memory device, a setting of the access level is not executed and the process of FIG. 4 is terminated. This is because, in case of a device having another function (such as a network communication), a communication with a controlling host is indispensable and an access control in the intervening card reader part may cause an erroneous operation.

In case the mounted PC card 111 is identified as a ROM device, a default selection for the access level setting is "readable" or "not accessible". Also in case the PC card is identified as a RAM or a flash memory, a default selection for the access level setting is "reading only", "read-write possible", or "not accessible".

In case the mounted PC card 111 shown in FIG. 4 is not unregistered (F303 to F307), set information for the PC card is read (F307) to control the access to such PC card.

<Setting Process for Access Level>

An access level setting process (F306) shown in FIG. 4 is executed as shown in FIG. 7. At first the initially extracted ID is used for newly generating a registration table for the PC card (F501), and an access level for the PC card is registered (F502).

Figure 8A:
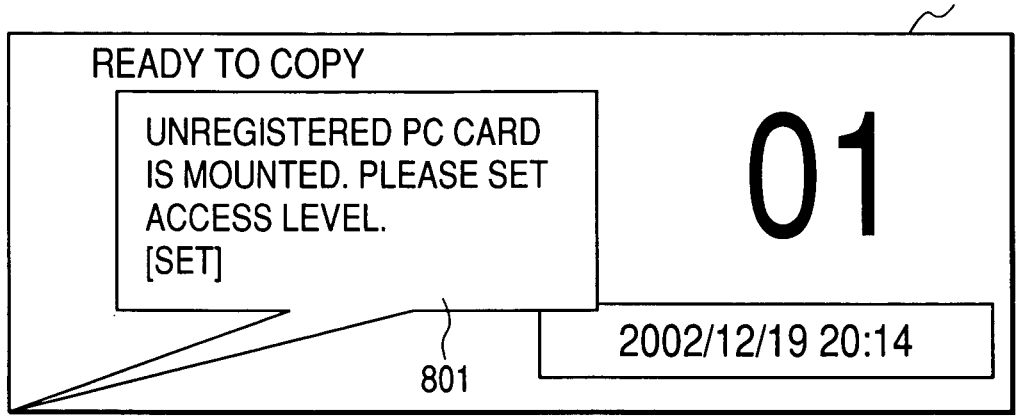
FIG. 8A is a schematic view showing a user interface for an access level registration for an unregistered PC card in the image processing apparatus of the embodiment 1.

In the registration of the access level, a setting image as shown in FIG. 8A is displayed on the display part 104 to request a registration to the operator. The display part 104 displays a dialog (message) 801 containing a character train, indicating an insertion of an unregistered PC card and requesting a registration of an access level.

Figure 8B:
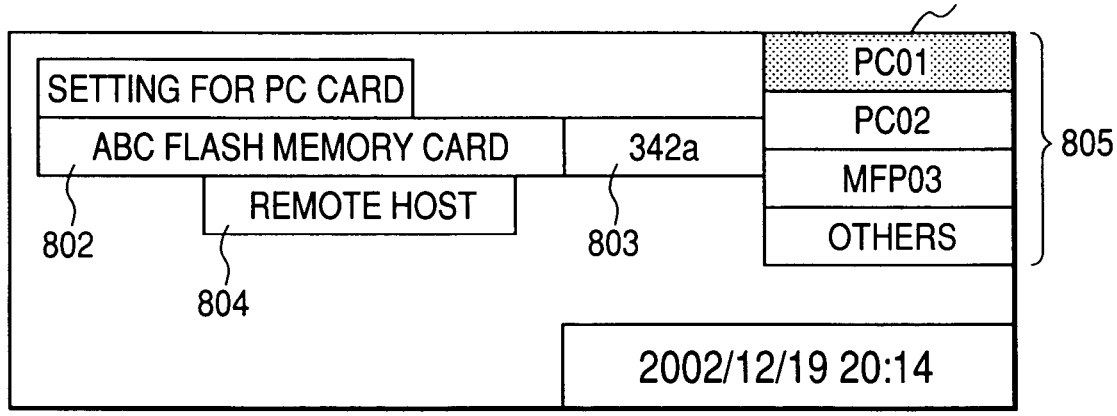
FIG. 8B is a schematic view showing a user interface for an access level registration for an unregistered PC card in the image processing apparatus of the embodiment 1.

When a registration operation for the access level is initiated by a predetermined sequence, the display part 104 activates a user interface as shown in FIG. 8B. There is displayed a list 805, in order that a host name detected by the aforementioned network initialization process can be registered as a host capable of accessing to the PC card. In a left side of the image, there are displayed a card name 802 and a card ID 803, in order to clarify to the user that the setting operation is executed on such card. A "remote host" column 804 is empty in this stage as the host has not been selected, but, when a host capable of accessing to the PC card is selected, such selected host is listed in this column. In the example shown in FIG. 8B, the host list 805 includes, in addition to PC 01, PC 02 and MFP 03, "others" as another selection item, which can be selected to set still other remote hosts.

Figure 8C:
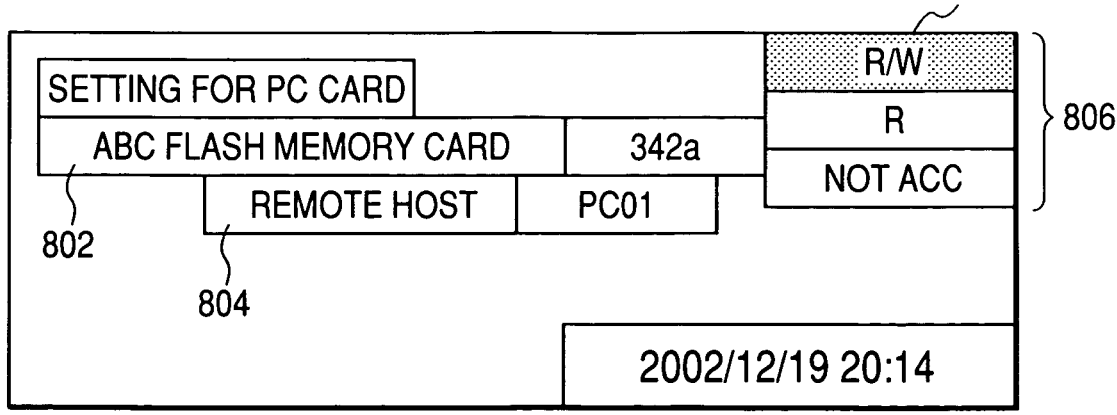
FIG. 8C is a schematic view showing a user interface for an access level registration for an unregistered PC card in the image processing apparatus of the embodiment 1.

Once a host capable of accessing to the PC card is set, an access level to such host can be set by a user interface as shown in FIG. 8C. In FIG. 8C, a "remote host" column 804 lists PC 01 as a host capable of accessing to the PC card, and the user interface shown in FIG. 8C displays a list 806 for setting the access level to such host. In the example shown in FIG. 8C (FIG. 8B), the PC card is a flash memory, and there can be selected, for such PC card, an access level of R/W (read/write possible), R (read only) or NotACC (not accessible).

Figure 9:
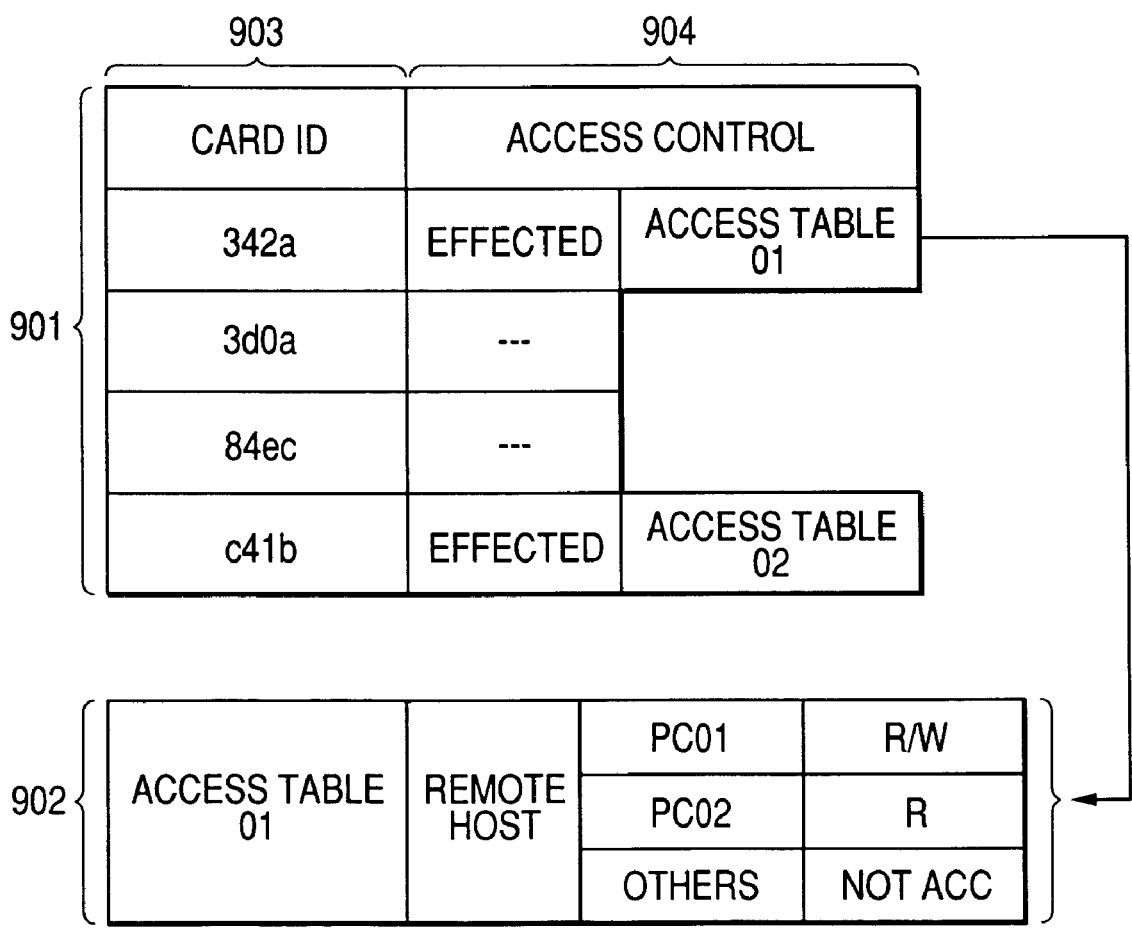
FIG. 9 is a schematic view showing a registration table of an access level for the PC card in the image processing apparatus of the embodiment 1.

Through the setting in the foregoing procedure, there is formed a registration table as shown in FIG. 9, which is stored in the RAM 102.

The registration table shown in FIG. 9 is formed, corresponding to each card ID 903, by access control information 904 constituted of a flag indicating whether or not to execute an access control and an access table 902 to be employed in the access control or a pointer thereto. Example shown in FIG. 9 indicates an access table 902 for a PC card having a card ID of 0x342a as in FIG. 8A. As illustrated, for the PC card having the card ID of 0x342a, a flag for "executing" an "access control" is set, and, as shown in the corresponding access table 902, access levels are so set that the remote host PC 01 can execute read/write (R/W) to the PC card, the remote host PC 02 can execute reading only (R) from the PC card and other remote hosts cannot access (NotACC) to the PC card.

A registration of an access level can be registered in this manner when an unregistered PC card is mounted.

<Process for Mounting of Registered Card>

In case a PC card with the access level registration as explained above is inserted, for example the IC card with a card ID of 0x342a in a state of registration as shown in FIG. 9 is mounted, the sequence shown in FIG. 4 goes through branches of F303 to F307 thereby reading the registration information shown in FIG. 9 in F307 in FIG. 4, whereby the access to the PC card is controlled according to such registration information.

It is assumed that the IC card with a card ID of 0x342a is a PC card formed by a flash memory and stores for example image data photographed with a digital camera.

<Access to PC Card>

An access to the PC card is controlled in the following manner.

(Access from a Remote Host)

The present embodiment assumes NetBIOS/CIFS (hereinafter also represented as SMB) as a protocol for sharing the network resources, and, in such environment, the PC cards of memory media such as a ROM, a RAM, a flash memory and the like, mounted in the communication apparatus can be shown (browsing) to other hosts as a shared folder on the Windows network.

Now, let us consider a case of an access from the remote host PC 01. Prior to establishing an SMB connection, a host verification is executed utilizing the registration information as shown in FIG. 9. Such host verification is executed on the OS level. At first, in case of an access from a remote host and in case such host is registered on the access table (902 in FIG. 9), a reference is made to an access level of such host to the mounted PC card.

In case the access level of such host in the access table is "read/write possible", an SMB connection is established. In case the access level is reading only, even if the file system on the PC card is set as "read/write possible", there is returned, in establishing the SMB connection, a parameter for reading only to the remote host which is an SMB client. More specifically, an Access Mode Encoding parameter, in response to a command SMB_COM_OPEN from the client at the SMB connection establishing, is set at Deny write (0x02) in the sharing mode. Also in case the access level is "not accessible", the aforementioned parameter is set at Deny read/write/execute (0x01).

As explained in the foregoing, in establishing an SMB (CIFS) connection, an access level control can be executed on the device corresponding to the mounted PC card, utilizing the registration information of the access table (902, FIG. 9) and according to the registration information of the access table.

In the present embodiment, the restriction on the access level can be automatically executed at the access from the remote host, without requiring that the user changes the setting information of the file system in the PC card (or corresponding to the PC card) with a file browser or the like.

In a setting shown in FIG. 9, in which the access control for the remote host PC 02 is R (reading only), the PC card (ID 0x342a) appears as read-only in an access from the remote host PC 02.

Figure 10:
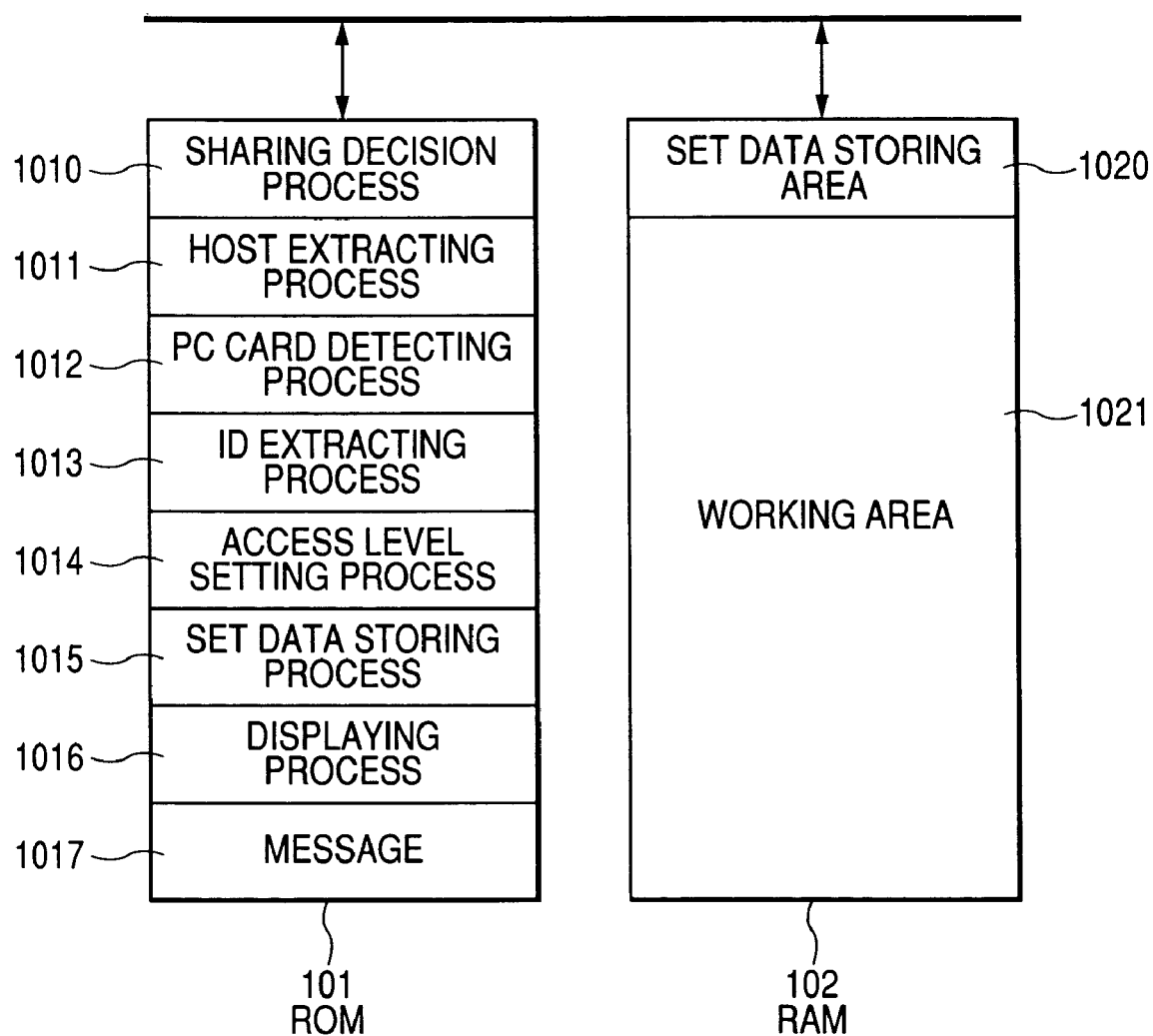
FIG. 10 is a schematic view showing a memory assignment of ROM and RAM in the image processing apparatus of the embodiment 1.

FIG. 10 shows a storage state of control programs for the aforementioned processes in the ROM 101 and a memory map of the RAM 102. The ROM 101 stores a sharing discrimination process 1010, a host extraction process 1011, a PC card detection process 1012, an ID extraction process 1013, an access level setting process 1014, a set value storage process 1015, a display process 1016, and messages 1017 utilized in various dialogs. Also the registration information as shown in FIG. 9 is stored in a set value storage area 1020 of the RAM 102, and the aforementioned control procedures are executed by the CPU 100 utilizing a work area 1021 of the RAM 102.

In the present embodiment, as explained in the foregoing, when an unregistered PC card is inserted, a setting user interface for access control for such PC card can be activated, thereby causing the user to set an appropriate access level.

Also in the present embodiment, when an unregistered PC card is inserted, a setting for the access control for such PC card is executed by the user and such access control information is used for the access control for the access from the remote host, so that an appropriate access control can be automatically executed at the access from the remote host without requiring that the user changes the setting information of the file system in the PC card (or corresponding to the PC card) with a file browser or the like.

In the foregoing embodiment, a network of Windows base is adopted as a network protocol for executing the acquisition of the host names and the sharing of the PC card. However the present invention is not limited to a network protocol, and a similar process is naturally possible for example, for acquiring the host names, by BIND which is a name service utilizing TCP/IP or AppleTalk of Apple Inc. Also in the foregoing embodiment, CIFS (SMB) is adopted for an access from the remote host to the PC card, but a similar access control is naturally possible by an access method by FTP or WebDAV of the internet protocol, by changing a file permission shown to the client (remote host) of such protocol.

Also the access control for the PC card may be executed not only in the host name as explained above but also by a user name to be used in the network and by setting an access level for each user (access level control for each user being understandable by replacing "host" in the foregoing description with "user (name)".

Also the access control for the PC card in the present embodiment can be executed in the unit of a host (or user) for each card ID, and is comprehensively available for the PC cards of various types. In the foregoing embodiment, the access control is executed only on the memory cards for the simplicity of explanation, but a similar control is naturally possible on the PC cards of other forms.

Also in the foregoing embodiment, the user interface for setting the access level is activated utilizing the display part 104 when a new PC card is mounted, but it is also possible, as in the embodiment to be explained later, to notify the remote host or the user thereof by an appropriate OS service or an e-mail through the network and to execute the setting for the access control utilizing a suitable remote interface (such as HTTP). In such case, in case the operation and status of the apparatus displayed by an HTTP protocol, there can also be achieved a control for displaying a mounting of a new card only in an access from a host to which the information is desired.

In the following there will be explained embodiments (embodiments 2 and 3) different in the configuration of notifying the mounting of the new PC card (unregistered PC card). In the following embodiments, components same as or equivalent to those in the embodiment 1 are represented by same (or similar) reference symbols and will not be explained in detail.

Embodiment 2

The present embodiment shows a configuration for notifying a preset host of an insertion of a new PC card (unregistered PC card) for which access control information is not registered.

In the present embodiment, the image processing apparatus and the network have configurations same as those shown in FIG. 1.

In the image processing apparatus of the present embodiment, an external interface initialization process (local/network connection discrimination control) executed at the turning-on of the power supply is executed in the same manner as shown in FIG. 2. After the initialization process relating to the local connection board 108 (F101 to F105), in case the network communication board 107 is judged to be present and linked (F106, F107), a network connection state is identified and a network initialization process is executed (F108, F110).

The initialization process of the network is executed in the same manner as in FIG. 3, and NetBIOS names such as "PC 01", "PC 02" and "MFP 03" connected to the network N are collected. Such collected host names are stored in the RAM 102.

Figure 13:
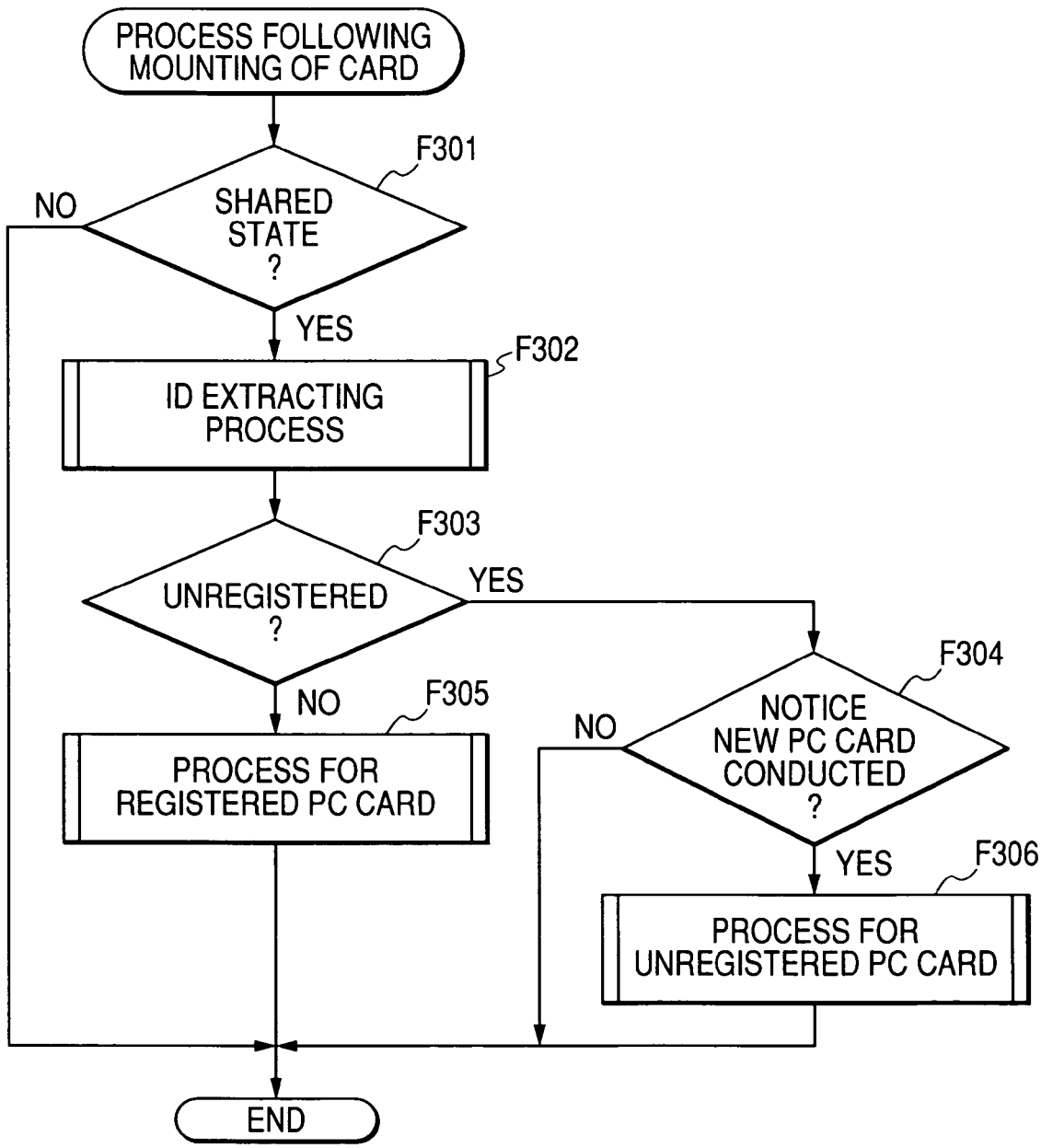
FIG. 13 is a flow chart showing a process of the image processing apparatus of the embodiment 2 at a mounting of a PC card.

A process at the mounting of the PC card is executed as shown in FIG. 13 (a flow chart corresponding to FIG. 4). Steps F301 to F303 in FIG. 13 are identical with those in FIG. 4, discriminating whether a device corresponding to the PC card 111 is in a "shared" state accessible from another host (or another apparatus) on the network N (F301) and, in case of "shared" state, executing an ID extraction process (F302). The ID extraction process (F302) executes a unique ID from the mounted PC card by a process shown in FIG. 5.

In the present embodiment, in case an ID extraction process in F303 in FIG. 13 identifies an unregistered ID, there is executed an unregistered PC card process (F306) in case of a setting for "notifying" another host of the insertion of the unregistered new PC card. Also in case of a registered PC card, there is executed a registered PC card process (F305).

Figure 11:
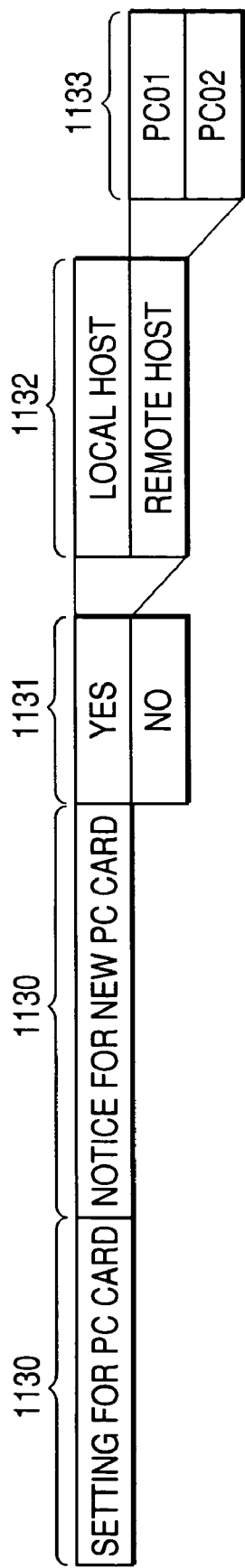
FIG. 11 is a schematic view showing registration information for a destination of a notice for a PC card mounting, to be employed in an image processing apparatus of an embodiment 2.

A judgment whether to "notify" or "not to notify" the other host of the insertion of the new unregistered PC card (F304) is executed according to setting information registered in advance in the RAM as shown in FIG. 11. The setting information shown in FIG. 11 is constituted, for example, of character train information 1130, 1130, ... to be employed for a user interface display, a flag 1131 indicating whether or not to notify the mounting of the new PC card, a flag 1132 indicating whether the notification is to be made to a local host or a remote host, and host identification information 1133 for identifying the host in case of notification to a remote host (host name such as PC 01 or PC 02, or an IP address).

Figure 12:
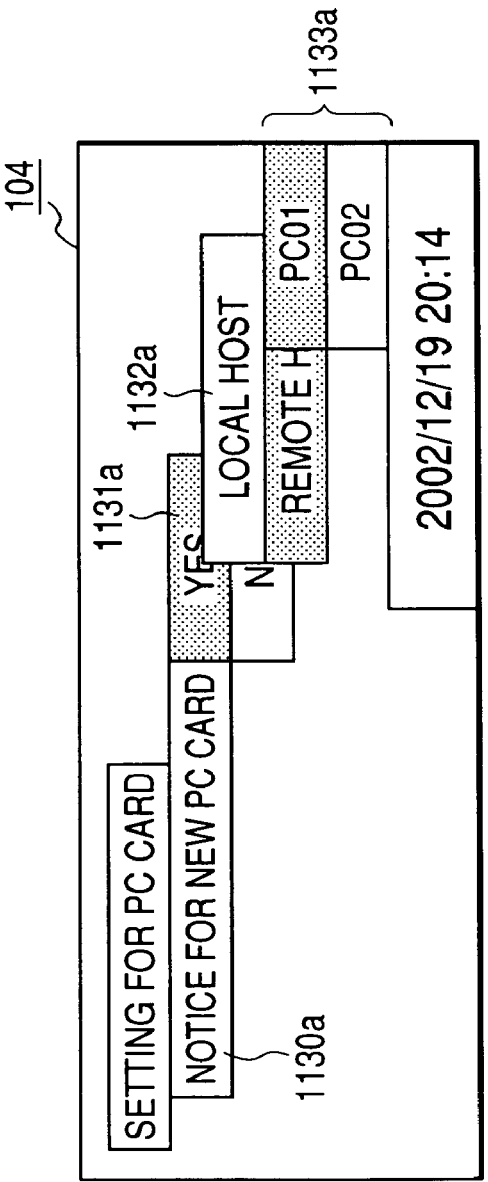
FIG. 12 is a schematic view showing a user interface for registering a destination for a notice of a mounting of an unregistered PC card in the image processing apparatus of the embodiment 2.

Also a user interface for the setting as shown in FIG. 11 can be obtained by displaying a dialog as shown in FIG. 12 on the display part 104. In the dialog shown in FIG. 12, menu items (or list) 1130a to 1133a are provided respectively corresponding to the character train information, the flag and the host identification information 1130 to 1133, and the information shown in FIG. 11 can be set by suitably operating these menu items with a keyboard or other operation means.

Figure 14:
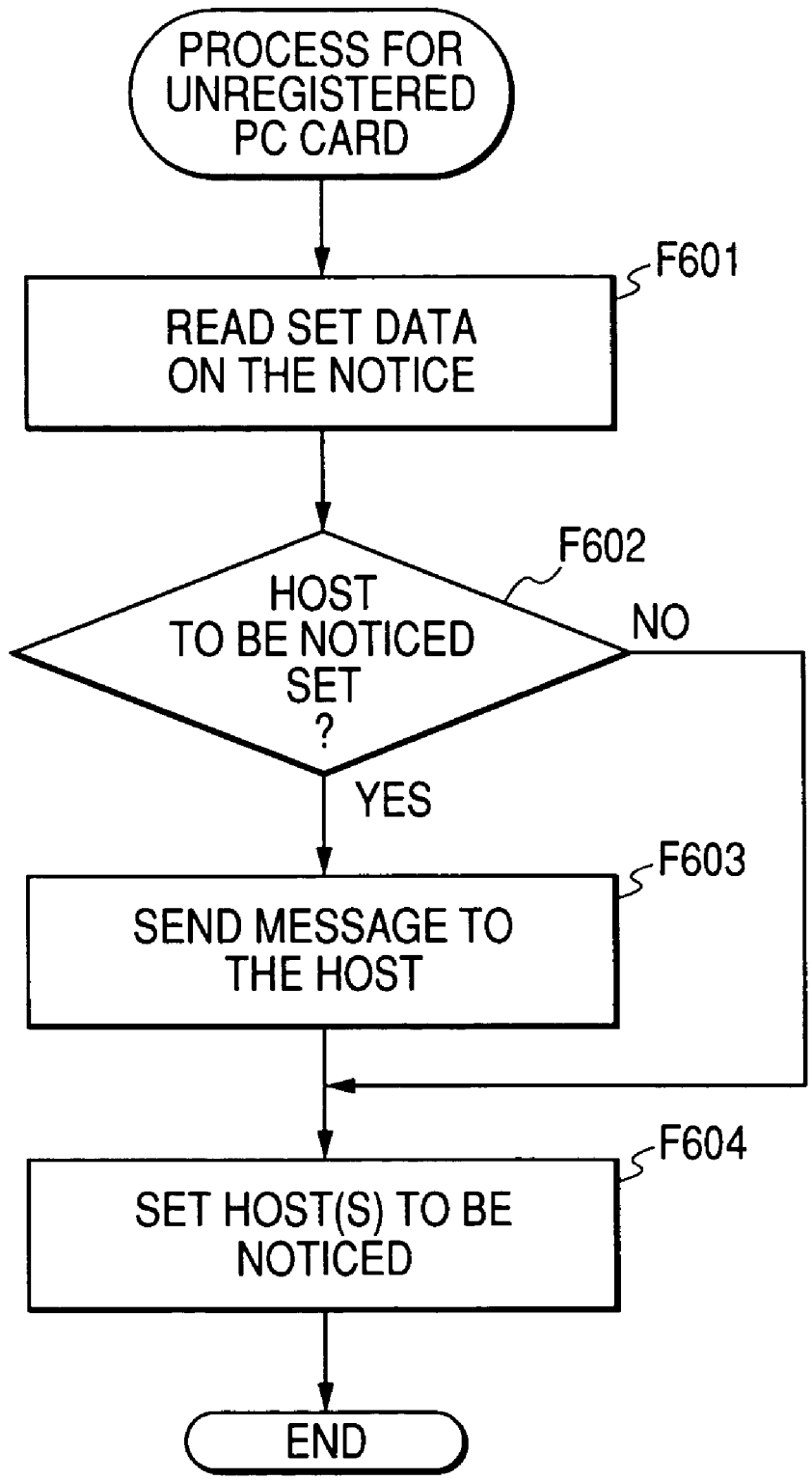
FIG. 14 is a flow chart showing a process for an unregistered PC card in the image processing apparatus of the embodiment 2.

The unregistered PC card process (F306) in FIG. 13 can be executed as shown in FIG. 14. At first a reference is made to an area of notice setting on the unregistered new PC card as shown in FIG. 11 (F601), and there is discriminated whether a host to be notified is set (F602). If a host to be notified is not registered, the sequence proceeds to a notification destination setting process for a registered PC card (F601→F604), but, in case a destination of notification (local host or remote host) is set, a message is transmitted to such set host, or an application software monitoring the operation status of the image processing apparatus functioning on such host (F603).

Such message transmission is executed, for the local host, by an appropriate protocol utilizing the local connection board 108, or to the remote host, through the network communication board 107 and the network N utilizing an appropriate message exchange protocol (for example an existing communication protocol on TCP/IP or an exclusively prepared protocol). In case of a notification to the remote host through the network N, such communication channel may be encrypted to improve the security.

In the information message for the mounting of the unregistered new PC card, there are simultaneously transmitted a vendor-name, a product name and a version number, acquired in the CIS information analysis (FIG. 5) of the ID extraction process.

Then F604 executes a setting whether or not to execute a notification when this PC card is mounted next time.

Figure 15:
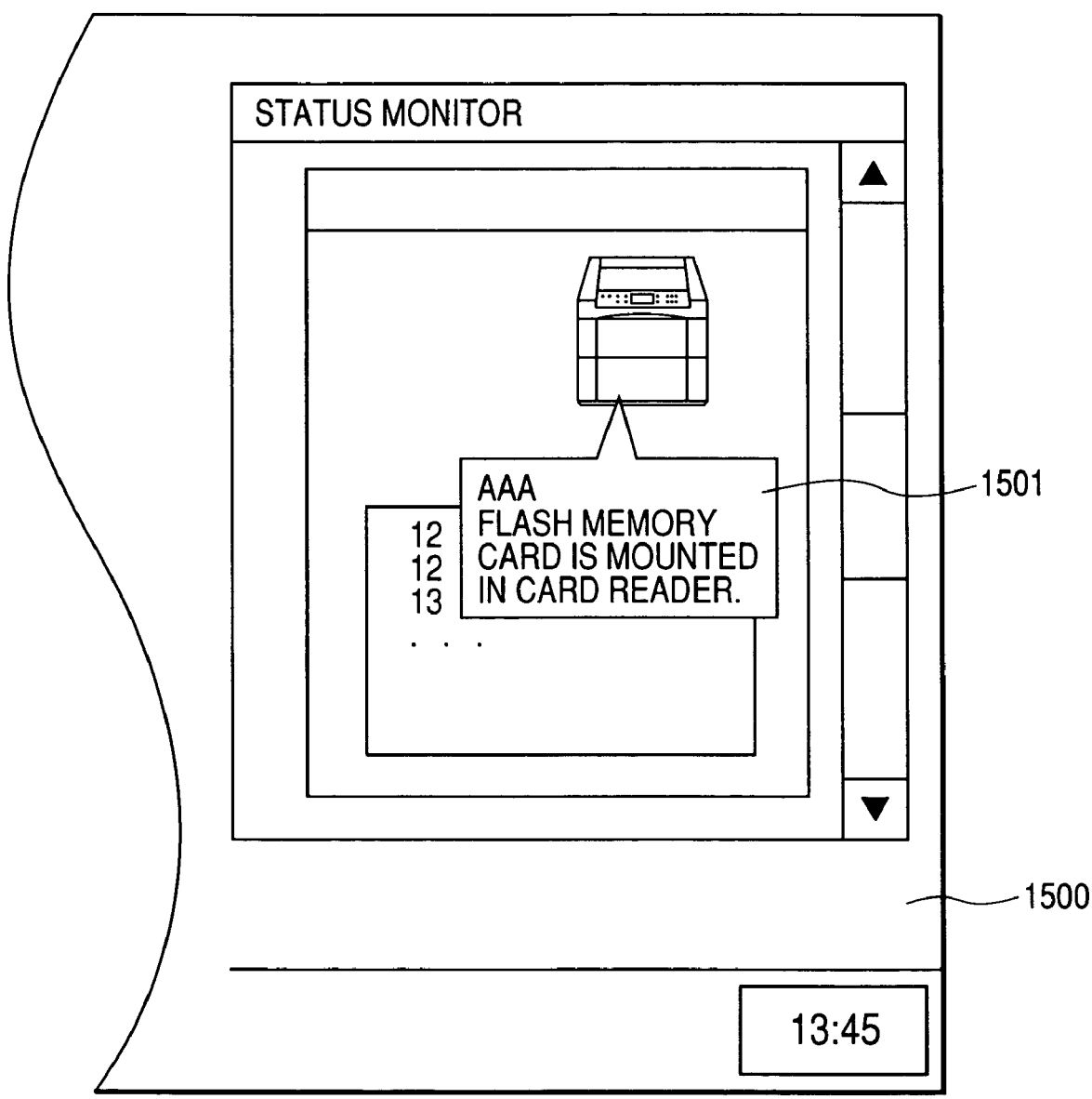
FIG. 15 is a schematic view showing an example of display in a host receiving a notice in the embodiment 2.

Thus the local/remote host (111 to 114 in FIG. 1) receiving the notification can display a notice dialog 1501 on a display 1500. The notice dialog 1501 in FIG. 15 can show that an unregistered new PC card is mounted, together with the information contained in the notification message such as the vendor name, the product name and the version number. Also in the local/remote host (111 to 114 in FIG. 1) receiving the notification, there can be executed a control on the access level as shown in Embodiment 1, in response to the notification.

Figures 17, 18:
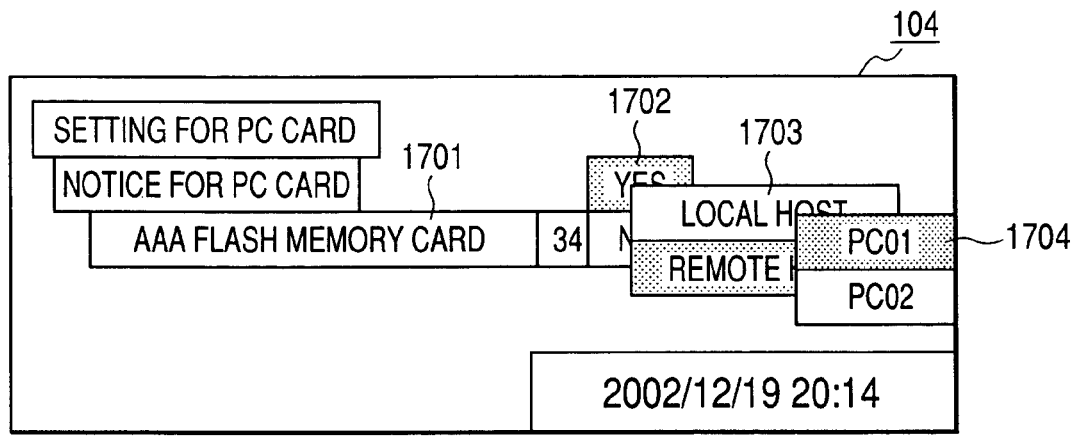
FIG. 17 is a schematic view showing a user interface for registering a destination of a notice for a mounting of a PC card in the image processing apparatus of the embodiment 2.
FIG. 18 is a schematic view showing registration information for a destination of a notice for a PC card mounting, in the image processing apparatus of the embodiment 2.

Also a setting (F604), relating to the notice when the PC card unregistered in FIG. 14 is mounted next time, can be executed as shown in FIGS. 17 and 18. FIG. 17 shows a user interface for such setting. The user interface shown in FIG. 17 is constituted for example of information 1701 such as a card name (type) and ID obtained in the CIS information analysis shown in FIG. 5, a menu item 1702 whether or not to execute a notification when the PC card is mounted next time, a menu item 1703 for executing a notification to the local or remote host, and a menu item 1704 for selecting a host name in case of notification to the remote host, displayed on the display part 104.

The registration process as explained above allows to generate registration information as shown in FIG. 18 on the RAM 102, for each mounted card. Example shown in FIG. 18 stores, for each of four PC cards (1801), a setting 1802, whether or not to notify the insertion, a local/remote setting 1803 in case a destination of notice is present, and a host name 1804 in case of a remote host.

Figure 16:
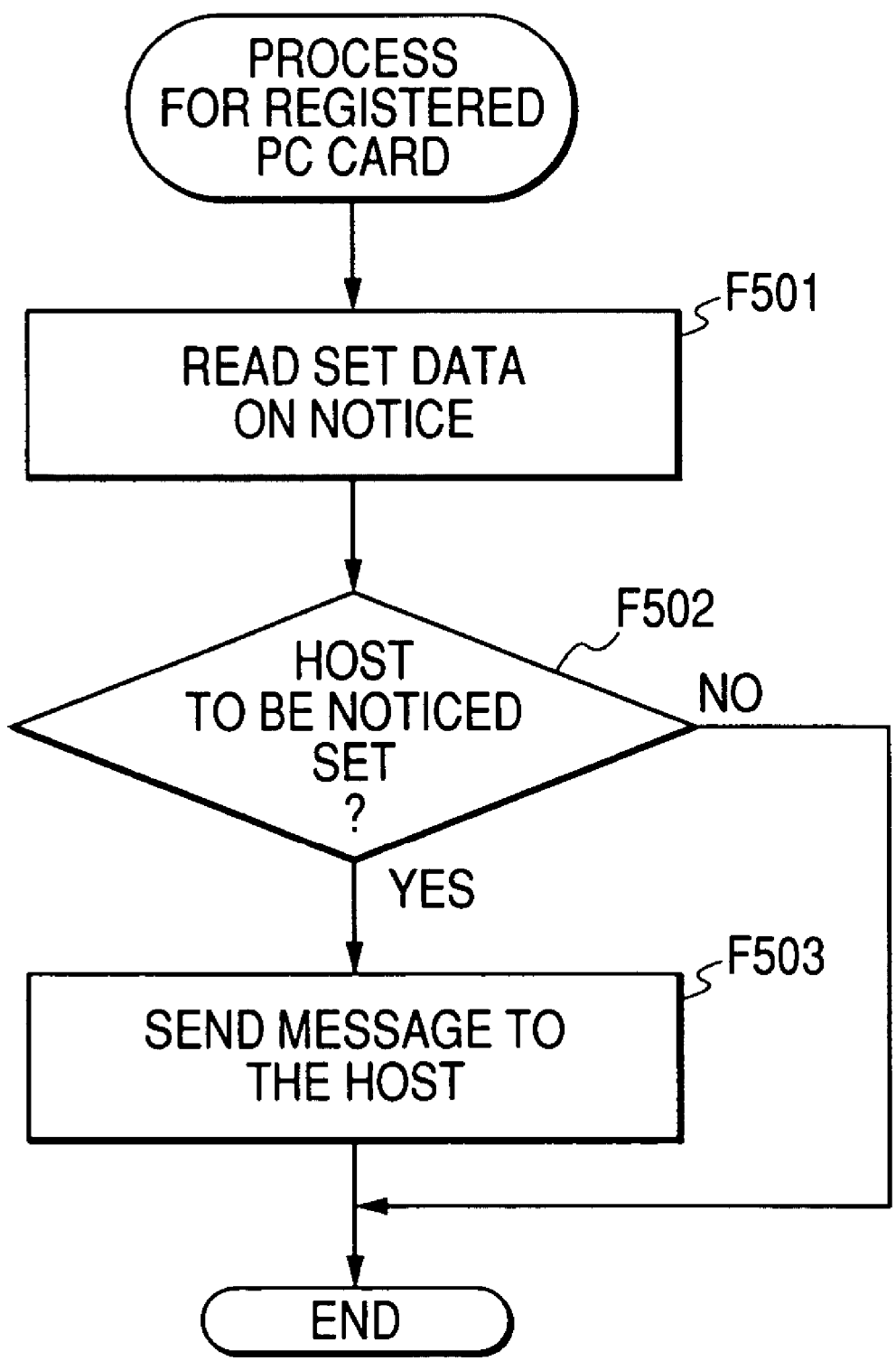
FIG. 16 is a flow chart showing a process for a registered PC card in the image processing apparatus of the embodiment 2.

A PC card thus registered (F305 in FIG. 13) is executed as shown in FIG. 16. At first data on notice are read (F501). This is achieved by reading, from the registration table of the PC card (FIG. 18), a setting of the host to be notified of the PC card, corresponding to the ID extracted by the ID extraction process.

In case, in the registration table of the PC card (FIG. 18), a setting of the host to be notified is "no notice", the sequence is terminated (F502→End).

Also in case the setting of the host to be notified is "to notify", the message is transmitted to the registered host (F503). The format of the transmitted message can be similar to that of the message transmitted in the unregistered PC card process.

Figure 19:
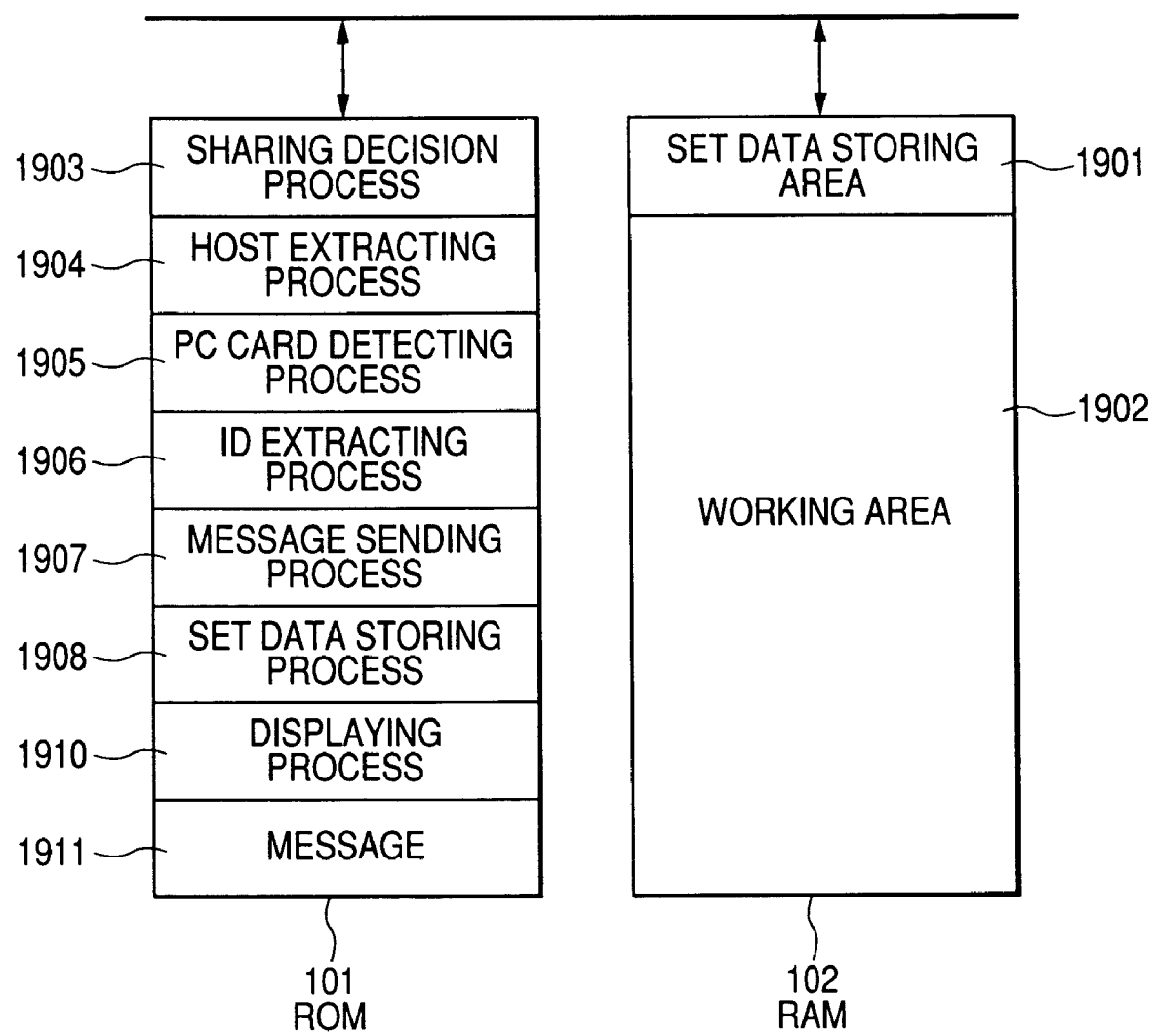
FIG. 19 is a schematic view showing a memory assignment of ROM and RAM in the image processing apparatus of the embodiment 2.

FIG. 19 shows a storage state of control programs for the aforementioned processes in the ROM 101 and a memory map of the RAM 102. The ROM 101 stores a sharing discrimination process 1903, a host extraction process 1904, a PC card detection process 1905, an ID extraction process 1906, a message transmission process 1907, a set value storage process 1908, a display process 1910, and messages 1011 utilized in various dialogs. Also the registration information as shown in FIG. 18 is stored in a set value storage area 1901 of the RAM 102, and the aforementioned control procedures are executed by the CPU 100 utilizing a work area 1902 of the RAM 102.

In this manner, at the insertion of an unregistered PC card, there can be transmitted that the unregistered PC card is inserted in the local/remote host, and the identification information of the vendor name, product name and version number of the card. The local/remote host receiving the notice for the insertion of the unregistered PC card can know such insertion of the unregistered PC card even in a remote location from the image processing apparatus, and can activate (either manually or automatically) an access level setting as in the embodiment 1.

Also in the present embodiment, the destination of notice at the mounting can be registered for each card ID, and, when the registered PC card is inserted again, the notification to the local/remote host can be made according to the registration information. Thus, the insertion of the unregistered PC card can be known even in a remote location from the image processing apparatus. It is thus rendered possible to remote monitor an inappropriate replacement or insertion of the PC card to achieve an easy network management, thereby significantly improving the security of the network system.

Embodiment 3

In Embodiment 2, the insertion of the PC card is notified by an appropriate protocol on the local interface or the network, but the insertion of the PC card can be notified by transmitting a mail to a user as shown in the following. Also in the present embodiment, as in Example 2, the notice for the mounting is not only executed for an unregistered PC card but for an unregistered or registered card if a notification is selected.

Figure 20:
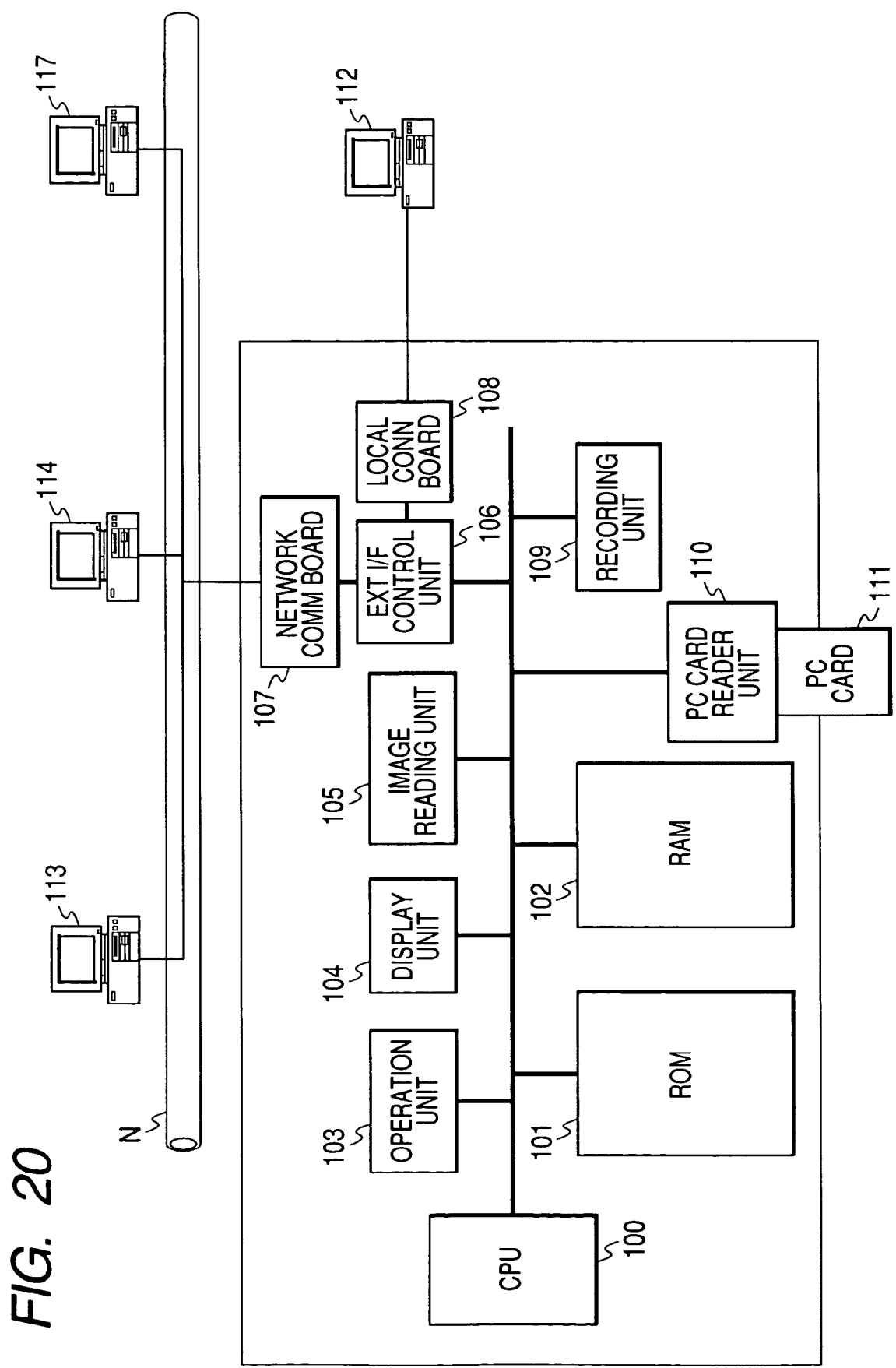
FIG. 20 is a block diagram showing a configuration of an image processing apparatus of an embodiment 3 of the present invention and a network environment in which the image processing apparatus is connected.

FIG. 20 shows a configuration of an image processing apparatus and a network of the present embodiment. The image processing apparatus (lower part in FIG. 20) has a configuration same as in FIG. 1, except that a mail server 117 (SV 01) for controlling a mail transfer is connected in the network N.

Figure 21:
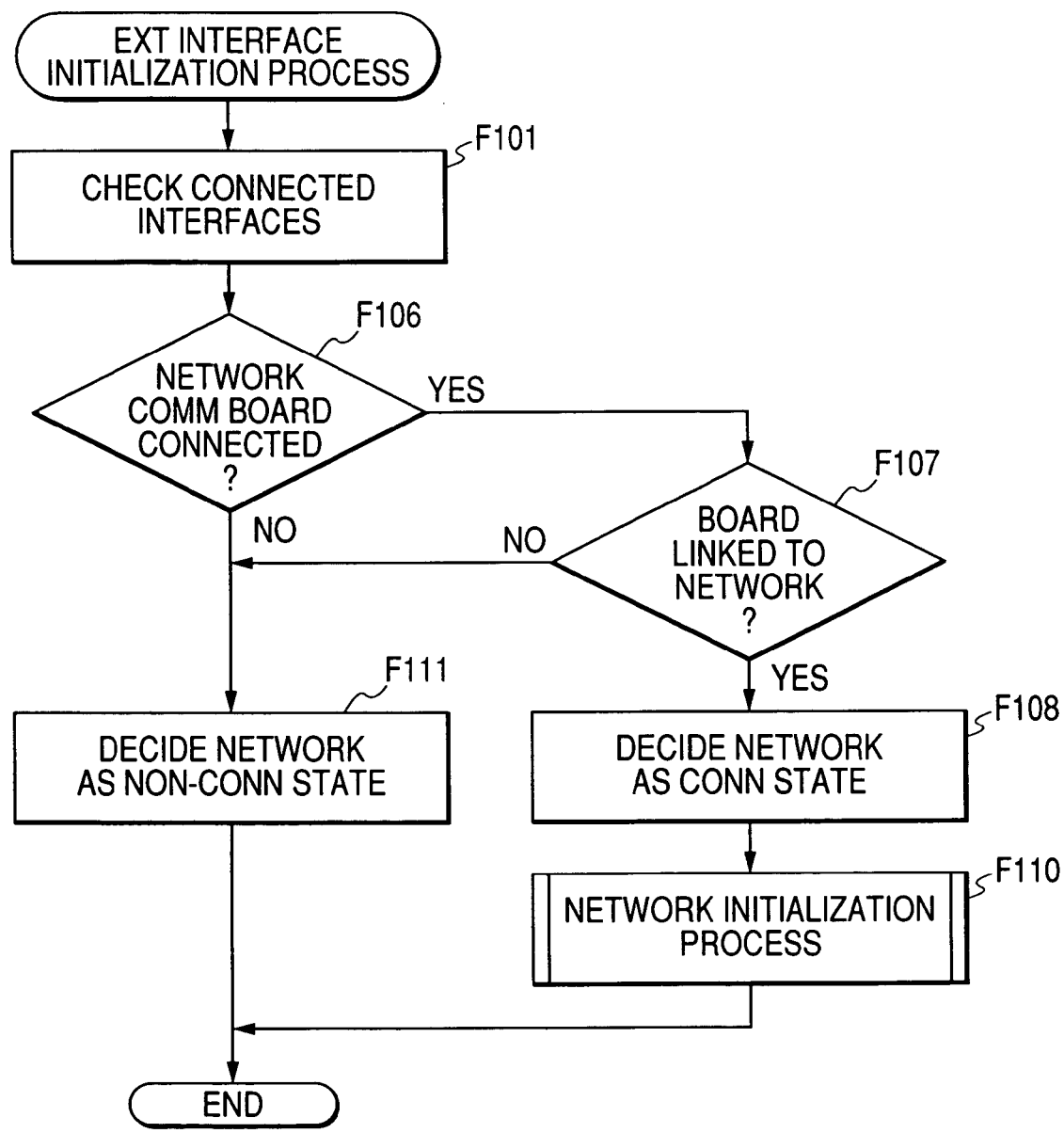
FIG. 21 is a flow chart showing an initialization process of an external interface of the image processing apparatus of the embodiment 3.

In the image processing apparatus of the present embodiment, an external interface initialization process (discrimination for local/network connection) at the turning-on of the power supply is executed as shown in FIG. 21. FIG. 21 corresponds to FIG. 2 in Embodiment 1 and same except that the local interface detection process of F102 to F105 is excluded. In case the network communication board 107 is judged to be present and linked (F106, F107), a network connection state is identified and a network initialization process is executed (F108, F110).

Figure 22:
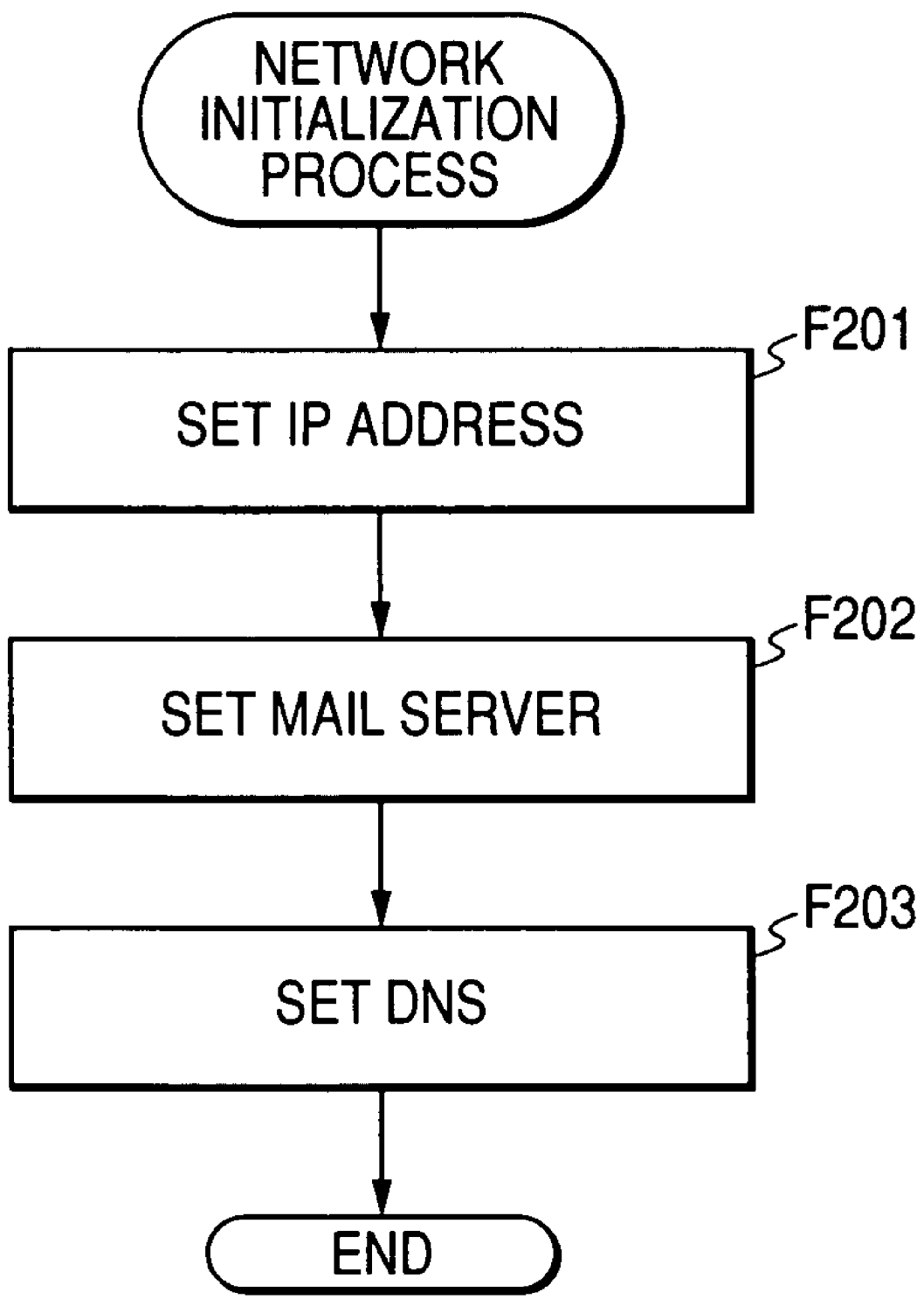
FIG. 22 is a flow chart showing a network initialization process in the image processing apparatus of the embodiment 3.

FIG. 22 shows an initialization process contained in the network initialization process (F110) in FIG. 21. The process at first executes an IP address setting (F201) of the network interface constituted by the network communication board 107, then a mail server setting (F202) and a DNS setting (F203). The mail server setting (F202) is executed for example by a method of copying set information such as an address of the mail server (117: SV01) to be employed in the mail transmission/reception in a system information area, so as to be utilized in the mail transmission process to be explained later. The DNS setting (F203) is a set-up process for the address information of a DNS (not shown) to be provided on the network N, and, in the present embodiment, and is executed by copying an IP address such as of the mail server (or another host requiring a communication such as destination of transmission) in the system information area of the RAM 102 of the image processing apparatus in such a manner that the mail transmission process can obtain such IP address from the host name.

Figures 31, 32:
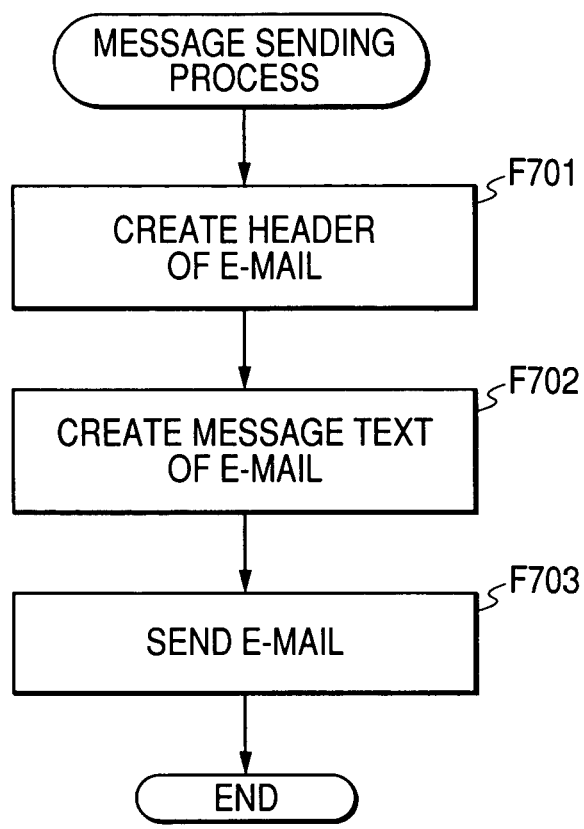
FIG. 31 is a flow chart showing a process for transmitting a message of a notice for a mounting of a PC card in the image processing apparatus of the embodiment 3.
FIG. 32 is a schematic view showing an example of a network setting in the embodiment 3.

FIG. 32 shows a state of settings relating to the network, copied in the system information area of the RAM 102 of the image processing apparatus. The address information in upper two rows is an IP address setting of the network interface constituted by the network communication board 107 of the present image processing apparatus (F201), and includes an IP address of the network interface and a subnet mask. In FIG. 32, there are set, in addition to the DNS address and the address of the mail server (SMTP), an address of a default gateway for transferring a packet to a different subnet segment address and a From Address (mfp01@jk1.com: mail address of the present image processing apparatus), to be employed as sender information in the mail transmission to be explained in the following.

In the present embodiment, a notice is given at the insertion of a PC card, and such notice is executed by a transmission of an e-mail to a preset specified user.

A destination of notice at the insertion of a PC card is set by the registration information as shown in FIG. 23. FIG. 23 shows a registration information format similar to that in FIG. 11 of Embodiment 2. The registration information in FIG. 23 is constituted of character train information 2300, 2300, ... to be employed for a user interface-display, a flag 2301 indicating whether or not to notify the new PC card, and name and mail address 2302 of the destination user in case of notification.

Figure 25:
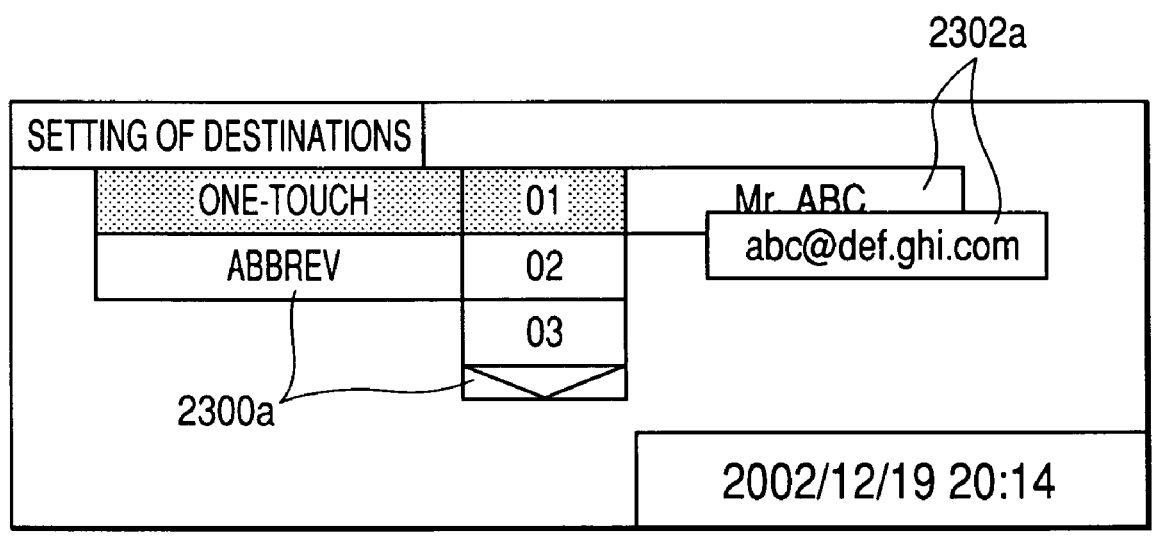
FIG. 25 is a schematic view showing a user interface for registering a destination for a notice of a mounting of an unregistered PC card in the image processing apparatus of the embodiment 3.

A user interface for the setting as shown in FIG. 23 can be obtained by displaying a dialog as shown in FIG. 24 or 25 on the display part 104.

The dialog shown in FIG. 24 includes menu items (or list) 2300a to 2302a respectively corresponding to the character train information, the flag and the mail address 2300 to 2302 shown in, FIG. 23, and the set information shown in FIG. 23 can be set up by suitably operating these menu items with a keyboard or other operation means. In FIG. 24, "Mr. ABC" is already set as a destination of notice, and such selection of the actual destination of notice can be executed by a dialog as shown in FIG. 25. FIG. 25 shows a mode of selecting a user "Mr. ABC: abc@def.ghi.com" 2302a utilizing so-called telephone book user interface 2300a for setting a one-touch or shortened dial utilized for example in an image communication. A user interface as shown in FIG. 25 can also designate plural destinations by an appropriate contracted dialing or a one-touch key, and, in FIG. 23, "Mr. DEF" is also set as the user of destination in addition to "Mr. ABC".

Figure 26:
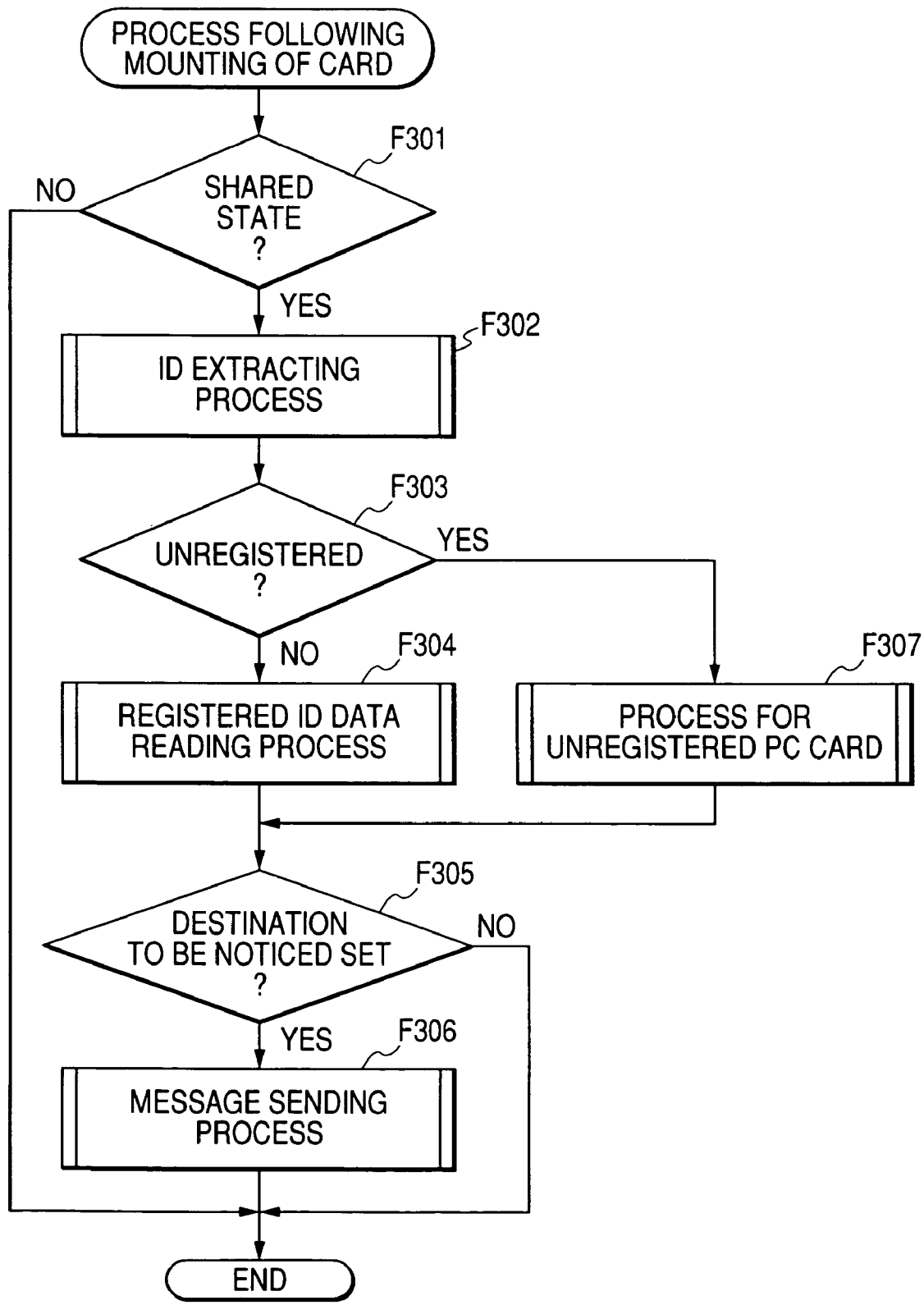
FIG. 26 is a flow chart showing a process of the image processing apparatus of the embodiment 3 at a mounting of a PC card.

A process at the mounting of the PC card is executed as shown in FIG. 26 (flow chart corresponding to FIG. 4 or 13). Steps F301 to F303 in FIG. 26 are identical with those in FIG. 4, discriminating whether a device corresponding to the PC card 111 is in a "shared" state accessible from another host (or another apparatus) on the network N (F301) and, in case of "shared" state, executing an ID extraction process (F302). The ID extraction process (F302) executes a unique ID from the mounted PC card by a process shown in FIG. 5.

Then there is discriminated whether the ID extracted from the PC card 111 (F303), and, according to the result thereof, there is executed a registered data reading (F304) or an unregistered PC card process (F307).

Then there is discriminated whether a destination of notice at the PC card mounting is set as shown in FIGS. 23 to 25 (F305), and, if set, a notice message transmission process (F306) is executed by an e-mail.

Figure 29:
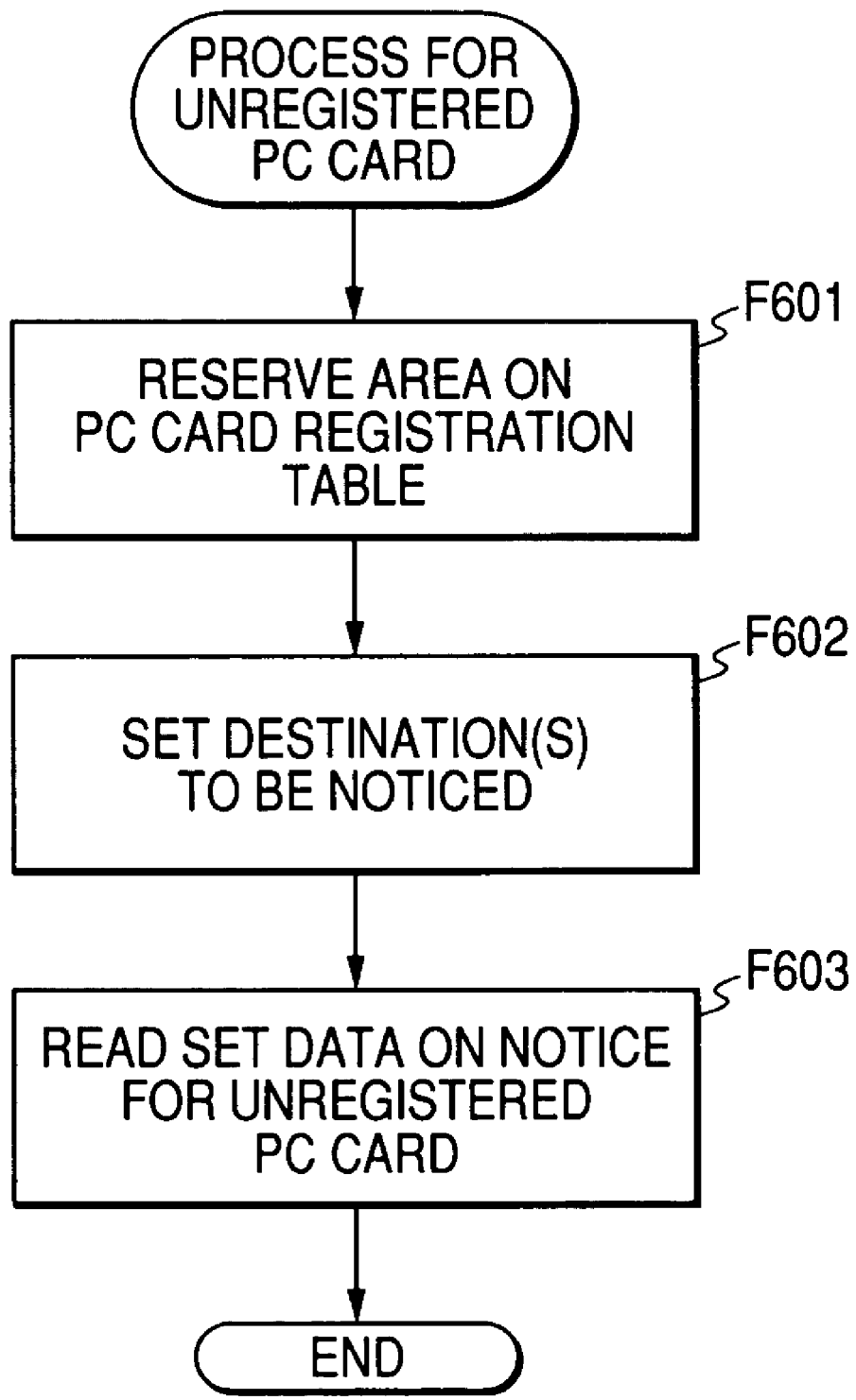
FIG. 29 is a flow chart showing a process for an unregistered PC card in the image processing apparatus of the embodiment 3.

An unregistered PC card process (F307) in FIG. 26 is executed as shown in FIG. 29. The unregistered PC card process is initiated, when a PC card not in a following PC card registration table is mounted, identifying an unregistered situation.

In such case, a new registration is executed on the following PC card registration table, at first by securing a registration area in the PC card registration table (F601) and setting a notice for such PC card (F602). Such notice setting is to set a destination of notice in case this PC card is inserted again and is conducted by a dialog shown in FIG. 30.

The dialog shown in FIG. 30 displays a vendor name and a device name read from the PC card as indicated by 3001 (different from the setting of destination in case of mounting of a registered PC card to be explained later), and there are prepared a menu item 3002 for setting whether or not to notify in case this card is mounted hereinafter and a field 3003 for setting the destination of notice. Also in this destination setting field 3003, the destination of notice can be set by the telephone book interface as shown in FIG. 25.

In FIG. 29, the PC card notice setting obtained in the processes of FIGS. 23 to 25 is read (F603). In case the PC card notice setting is to "notify", the destination of notice is also read and is stored in a predetermined system area for use in the mail transmission.

Figure 27:
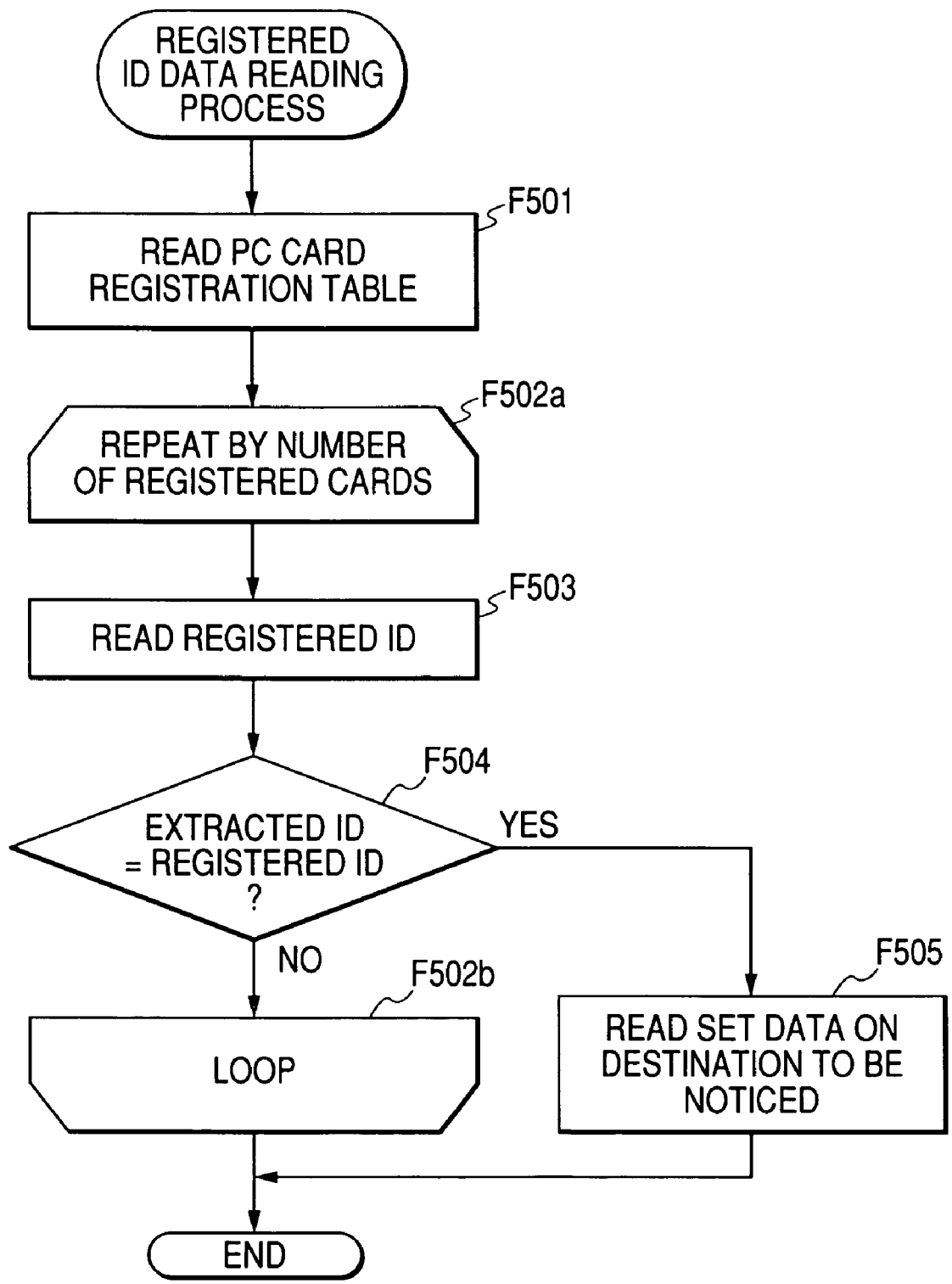
FIG. 27 is a flow chart showing an registered ID reading process in the image processing apparatus of the embodiment 3.

On the other hand, a registered data reading process (F304) in FIG. 26 is executed as shown in FIG. 27.

Figure 30:
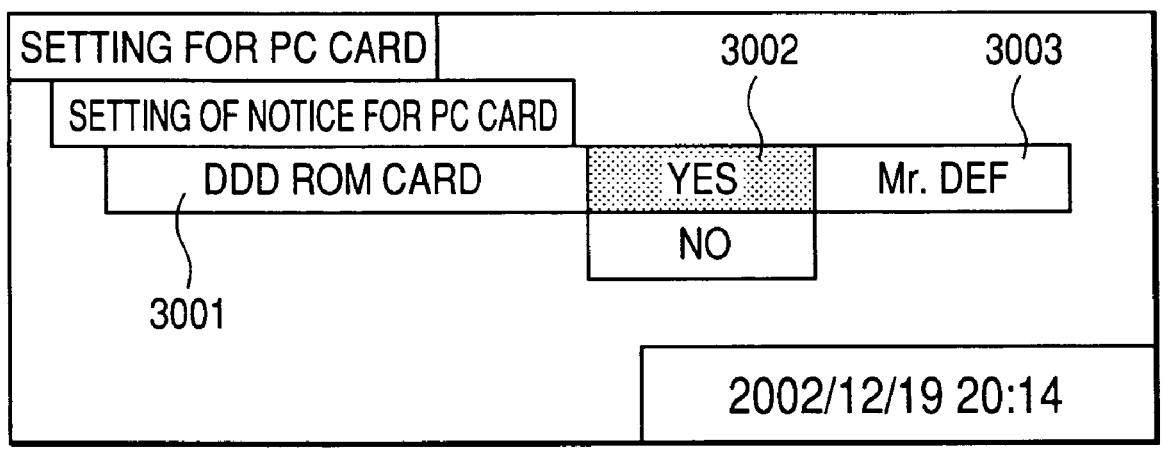
FIG. 30 is a schematic view showing a user interface for registering a destination of a notice for a mounting of a PC card in the image processing apparatus of the embodiment 3.

By repeating the process as shown in FIGS. 29 and 30 on an unregistered PC card, a PC card registration table as shown in FIG. 28 is generated in the system area. The PC card registration table shown in FIG. 28 is constituted of a card ID 2801, device information 2802 of the card, a flag 2803 whether or not to execute a notice at the insertion for each card (to be executed in F602 in FIG. 29), and a destination of notice 2804.

In the registered data reading process shown in FIG. 27, the PC card registration table generated as shown in FIG. 28 is read from the system area to the work area of the RAM 102, and by a loop process (F502*a* to F502*b*), a record of a card ID matching the ID of the inserted PC card from the PC card registration table.

More specifically, in the loop process (F502*a* to F502*b*), at first the card ID is read (F503) and is compared with the ID extracted by the ID extraction process (F504). For example, in case the ID extracted from the mounted card is 0xc41b, it matches a fourth ID registered in the PC card registration table shown in FIG. 28. Thus the ID extracted from the mounted card can be used as a key for searching the registered information of the card registered in the PC card registration table, and in case of a successful search, the setting of destination is read from the corresponding record in the PC card registration table (F505).

The destination of notice at the PC card mounting can be obtained by the aforementioned registered ID data reading process (F304) or the unregistered PC card process (F307) in FIG. 26, if a notice is required (F305), a message transmission process by an e-mail (F306) can be executed.

The message transmission process by an e-mail (F306) can be executed as shown in FIG. 31. The message transmission process by an e-mail (F306) in FIG. 31 executes an e-mail transmission to a destination of notice at the mounting of the PC card, obtained in the registered ID data reading process (F304) or the unregistered PC card process (F307).

In this process, a header portion of e-mail is generated (F701). In a From: header of the header portion, there is set a value registered in the From setting of the network setting shown in FIG. 32. In a To: header, there is set a mail address stored as the destination of notice. Also in a Subject: header, there is generated and incorporated an appropriate character train indicating the mounting of a PC card, such as "[notification] PC car attached". In this manner header settings are made on the source, destination and content of the e-mail text.

Then a main text of the e-mail is set (F702). In the main text of the e-mail, the device information corresponding to the ID of the extracted PC card is read from the PC card registration table and processed as the data of the main text. For example the main text of the message for a PC card with a card ID 342*a* (hexadecimal) is made as ["AAA Flash Memory Card" has been attached to mfp 01] so that the receiving user can easily identify the attached PC card. The foregoing examples of the headers and main text of the mail are given in English language, but the language of such text is naturally selected arbitrarily.

Then the e-mail text thus generated is transmitted (F703) by the SMTP protocol to the SMTP server in the network setting shown in FIG. 32 (mail server 117 in FIG. 20). The SMTP transmission of e-mail is already known for example in RFC and will not, therefore, be explained in detail.

Figure 33:
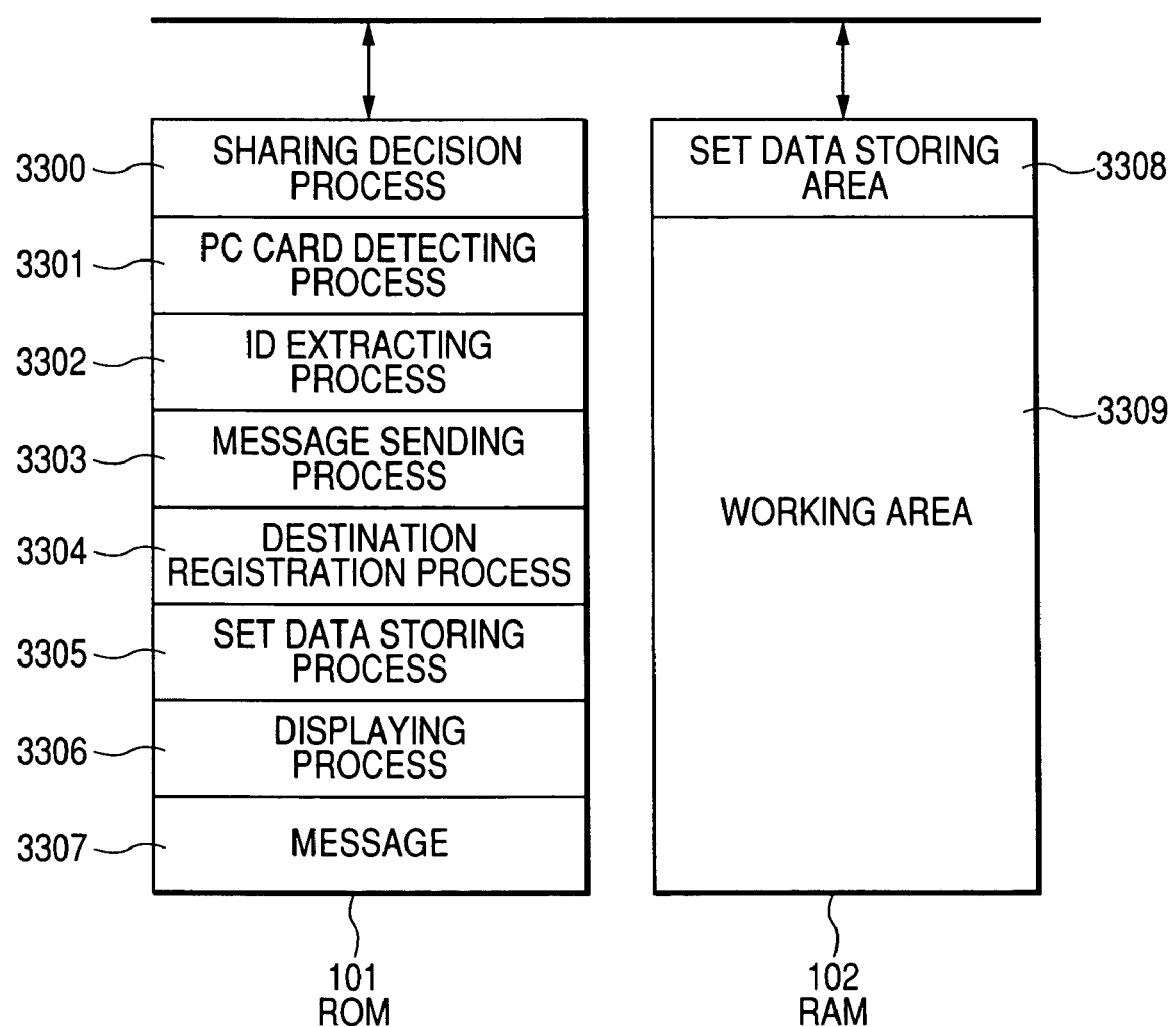
FIG. 33 is a schematic view showing a memory assignment of ROM and RAM in the image processing apparatus of the embodiment 3.

FIG. 33 shows a storage state of control programs for the aforementioned processes in the ROM 101 and a memory map of the RAM 102. The ROM 101 stores a sharing discrimination process 3300, a PC card detection process 3301, an ID extraction process 3302, an (e-mail) message transmission process 3303, a destination registration process 3304, a set value storage process 3305, a display process 3306, and messages 3307 utilized in various dialogs. Also the registration information as shown in FIGS. 23 and 28 is stored in a set value storage area 3308 of the RAM 102, and the aforementioned control procedures are executed by the CPU 100 utilizing a work area 3309 of the RAM 102.

In this manner, at the insertion of a PC card, there can be transmitted that a PC card is inserted in the local/remote host, and the identification information of the vendor name, product name and version number of the card, by an e-mail. The user receiving the notice for the insertion of the PC card can know such insertion of the registered or unregistered PC card even in a remote location from the image processing apparatus. It is thus rendered possible to remote monitor an inappropriate replacement or insertion of the PC card to achieve an easy network management, thereby significantly improving the security of the network system.

The present invention can be executed in an image processing apparatus having a PC card interface for attaching a PC card constituting a predetermined device and executing data input/output on such PC card. A software for realizing the method and the programs of the invention may be installed, at the shipment in a memory medium such as a ROM (or an HDD or the like) of the image processing apparatus, or may be introduced or updated into such apparatus through a network.

As explained in the foregoing, a configuration in which, when an unregistered PC card is inserted, a setting for the access control for such PC card is executed by the user, such access control information can be used for the access control, so that an appropriate access control can be automatically executed at the access from the remote host without requiring that the user changes the setting information of the file system in the PC card (or corresponding to the PC card) with a file browser or the like.

Also in a configuration in which a destination of notice at the mounting is registered for each card, and, when the PC card is inserted, a PC card mounting notice message is transmitted according to the registration information, the user can know the insertion of the unregistered PC card even in a remote location from the image processing apparatus. It is thus rendered possible to remote monitor an inappropriate replacement or insertion of the PC card to achieve an easy network management, thereby significantly improving the security of the network system.

The PC card mounting notice message can be transmitted by a predetermined network protocol, such as an exclusive network protocol or a known e-mail protocol.

This application claims priority from Japanese Patent Application No. 2004-219553 filed on Jul. 28, 2004, which is hereby incorporated by reference herein.

What is claimed is:

1. An image processing apparatus comprising:
   a PC card interface for detachably attaching a PC card constituting a predetermined device and executing data input/output on the PC card;
   storing means which stores an access table;
   access level setting means which sets an access level for the PC card by registering at least a device type and an ID extracted from the PC card and information of an access control, in the access table;
   detecting means which detects a presence/absence of a setting of the access level for a device of the mounted PC card or information thereof by extracting at least the device type and the ID from the PC card and checking the device type and the ID with the access table in the storing means;
   user interface means which requests the setting of an access level where access to the PC card is allowed or an access level where access to the PC card is inhibited to a user based on a detection result of the detecting means when a PC card not having the setting of the access level is mounted in the PC card interface; and
   control means which controls a permission or an inhibition of an access to the PC card itself in accordance with the ID extracted from the PC card and a setting of the access level by the access level setting means.

2. An image processing apparatus according to claim 1, wherein the access level setting means sets the access level to the PC card in the unit of a user or a host.

3. An image processing apparatus comprising:
a PC card interface for detachably attaching a PC card constituting a predetermined device and executing data input/output on the PC card;
storing means which stores a notice table;
registration means which registers (1) at least a device type and an ID extracted from the PC card, (2) when the PC card is mounted in the PC card interface, whether or not to transmit a notice for the mounting and (3) in case of transmitting the notice, a destination for the notice of mounting, in the table;
detecting means which detects a presence/absence of registering whether or not to transmit the notice of mounting for the mounted PC card and the destination for the notice of mounting in case of transmitting the notice of mounting, by extracting at least the device type and the ID from the PC card and checking the device type and the ID with the notice table in the storing means;
message transmission means which, in case a PC card subjected to the registration of the destination for the notice for the mounting in order to transmit the notice for mounting is mounted in the PC card interface, transmits a PC card mounting notice message to a destination for the notice of mounting read from the notice table based on a detection result of the detecting means; and
operation means operable by means of a user to cause the registration means to register whether or not the message transmission means transmits the message in case of an unregistered PC card,
wherein the message transmission means transmits the PC card mounting notice message in accordance with such case that the ID extracted from the PC card is unregistered and such case that a registration for transmitting a notice, when an unregistered PC card is mounted, is performed by the registration means.

4. An image processing apparatus according to claim 3, wherein, in case a PC card not subjected to the registration is mounted in the PC card interface, the message transmission means transmits a PC card mounting notice message to a preset destination for an unregistered PC card mounting notice.

5. An image processing apparatus according to claim 3 or 4, wherein the unregistered PC card mounting notice message is transmitted through a network according to a predetermined protocol.

6. An image processing apparatus according to claim 5, wherein the message transmission means transmits the PC card mounting notice message through a network according to an e-mail format.

7. A control method for an image processing apparatus utilizing a PC card interface for detachably attaching a PC card constituting a predetermined device and executing data input/output on the PC card and storing means which stores an access table, the method comprising:
an access level setting step which sets an access level for the PC card by registering at least a device type and an ID extracted from the PC card and information of an access control, in the access table;
a detecting step which detects a presence/absence of a setting of the access level for a device of the mounted PC card of information thereof by extracting at least the device type and the ID from the PC card and checking the device type and the ID with the access table in the storing means;
a user interface step which requests the setting of an access level where access to the PC card is allowed or an access level where access to the PC card is inhibited to a user based on a detection result of the detecting step when a PC card not having the setting of the access level is mounted in the PC card interface; and
a control step which controls a permission or an inhibition of an access to the PC card itself in accordance with the ID extracted from the PC card and a setting of the access level in the access level setting step.

8. A control method for an image processing apparatus according to claim 7, wherein the access level setting step sets the access level to the PC card in the unit of a user or a host.

9. A control method for an image processing apparatus utilizing a PC card interface for detachably attaching a PC card constituting a predetermined device and executing data input/output on the PC card and storing means which stores a notice table, the method comprising:
a registration step which registers (1) at least a device type and an ID extracted from the PC card, (2) when the PC card is mounted in the PC card interface, whether or not to transmit a notice for the mounting and, in case of transmitting the notice and (3) a destination for the notice of mounting, in the notice table;
a detecting step which detects a presence/absence of registering whether or not to transmit the notice of mounting for the mounted PC card and the destination for the notice of mounting in case of transmitting the notice of mounting, by extracting at least the device type and the ID from the PC card and checking the device type and the ID with the notice table in the storing means;
a message transmission step which, in case a PC card subjected to the registration of the destination for the notice of the mounting in order to transmit the notice for mounting is mounted in the PC card interface, transmits a PC card mounting notice message to a destination for the notice of mounting read from the notice table based on a detection result of the detecting step; and
an operation step operable by a user to cause the registration step to register whether or not the message transmission step transmits the message in case of an unregistered PC card,
wherein the message transmission step transmits the PC card mounting notice message in accordance with such case that the ID extracted from the PC card is unregistered and such case that a registration for transmitting a notice, when an unregistered PC card is mounted, is performed by the registration step.

10. A control method for an image processing apparatus according to claim 9, wherein, in case a PC card not subjected to the registration is mounted in the PC card interface, the message transmission step transmits a PC card mounting notice message to a preset destination for an unregistered PC card mounting notice.

11. A control method for an image processing apparatus according to claim 9 or 10, wherein the message transmission step transmits the PC card mounting notice message through a network according to a predetermined protocol.

12. A control method for an image processing apparatus according to claim 11, wherein the message transmission step transmits the PC card mounting notice message through a network according to an e-mail format.

13. A non-transitory computer-readable storage medium on which is stored a control program for an image processing apparatus utilizing a PC card interface for detachably attaching a PC card constituting a predetermined device and executing data input/output on the PC card and storing means which stores an access table, the program comprising:

an access level setting step which sets an-access level for the PC card by registering at least a device type and an ID extracted from the PC card and information of an access control, in the access table;

a detecting step which detects a presence/absence of a setting of the access level for a device of the mounted PC card or information thereof by extracting at least the device type and the ID from the PC card and checking the device type and the ID with the access table in the storing means;

a user interface step which requests the setting of an access level where access to the PC card is allowed or an access level where access to the PC card is inhibited to a user based on a detection result of the detecting step when a PC card not having the setting of the access level is mounted in the PC card interface; and a control step which controls a permission or an inhibition of an access to the PC card itself in accordance with the ID extracted from the PC card and a setting of the access level in the access level setting step.

14. A non-transitory computer-readable storage medium on which is stored a control program for an image processing apparatus according to claim 13, wherein the access level setting step comprises a control step for setting the access level to the PC card in the unit of a user or a host.

15. A non-transitory computer-readable storage medium on which is stored a control program for an image processing apparatus utilizing a PC card interface for detachably attaching a PC card constituting a predetermined device and executing data input/output on the PC card and storing means which stores a notice table, the program comprising:

a registration step which registers (1) at least a device type and an ID extracted from the PC card, (2) when the PC card is mounted in the PC card interface, whether or not to transmit a notice for the mounting and (3) in case of transmitting the notice, a destination for the notice of mounting, in the notice table;

a detecting step which detects a presence/absence of registering whether or not to transmit the notice of mounting for the mounted PC card and the destination for the notice of mounting in case of transmitting the notice of mounting, by extracting at least the device type and the ID from the PC card and checking the device type and the ID with the notice table in the storing means;

a message transmission step which, in case a PC card subjected to the registration of the destination of the notice of the mounting in order to transmit the notice of mounting is mounted in the PC card interface, transmits a PC card mounting notice message to a destination for the notice of mounting read from the notice table based on a detection result of the detecting step; and an operation step operable by a user to cause the registration step to register whether or not the message transmission step transmits the message in case of an unregistered PC card, wherein the message transmission step transmits the PC card mounting notice message in accordance with such case that the ID extracted from the PC card is unregistered and such case that a registration for transmitting a notice, when an unregistered PC card is mounted, is performed by the registration step.

16. A non-transitory computer-readable storage medium on which is stored a control program for an image processing apparatus according to claim 15, wherein, in case a PC card not subjected to the registration is mounted in the PC card interface, the message transmission step executes a control step for transmitting a PC card mounting notice message to a preset destination for an unregistered PC card mounting notice in the computer in the image processing apparatus.

17. A non-transitory computer-readable storage medium on which is stored a control program for an image processing apparatus according to claim 15 or 16, wherein the message transmission step executes a control step for transmitting the PC card mounting notice message through a network according to a predetermined protocol in the computer in the image processing apparatus.

18. A non-transitory computer-readable storage medium on which is stored a control program for an image processing apparatus according to claim 17, wherein the message transmission step executes a control step for transmitting the PC card mounting notice message through a network according to an e-mail format in the computer in the image processing apparatus.

* * * * *